(12) United States Patent
Beers et al.

(10) Patent No.: US 11,651,003 B2
(45) Date of Patent: May 16, 2023

(54) INTERACTIVE DATA VISUALIZATION INTERFACE FOR DATA AND GRAPH MODELS

(71) Applicant: Tableau Software, LLC, Seattle, WA (US)

(72) Inventors: Andrew C. Beers, Seattle, WA (US); Jun Ho Kim, Sammamish, WA (US); Ryan Andrew Atallah, Palo Alto, CA (US); Scott Sherman, Seattle, WA (US); Eleanor Page Darby Fields, Mercer Island, WA (US); Jeffrey Jon Weir, Seattle, WA (US)

(73) Assignee: Tableau Software, LLC, Seattle, WA (US)

( * ) Notice: Subject to any disclaimer, the term of this patent is extended or adjusted under 35 U.S.C. 154(b) by 0 days.

(21) Appl. No.: 16/586,554

(22) Filed: Sep. 27, 2019

(65) Prior Publication Data

US 2021/0097065 A1    Apr. 1, 2021

(51) Int. Cl.
*G06F 16/248* (2019.01)
*G06F 16/21* (2019.01)
(Continued)

(52) U.S. Cl.
CPC .......... *G06F 16/248* (2019.01); *G06F 3/0482* (2013.01); *G06F 3/0484* (2013.01);
(Continued)

(58) Field of Classification Search
CPC ............... G06F 16/248; G06F 16/2425; G06F 16/2428; G06F 16/252; G06F 16/212;
(Continued)

(56) References Cited

U.S. PATENT DOCUMENTS 5,550,971 A    8/1996   Brunner et al.
5,689,711 A    11/1997  Bardasz et al.
(Continued)

FOREIGN PATENT DOCUMENTS

WO    2006060773 A2    6/2006

OTHER PUBLICATIONS

Pienta et al., "Visage: Interactive Visual Graph Querying", AVI'16, Jun. 7-10, 2016, Bari Italy. pp. 272-279.
(Continued)

*Primary Examiner* — Kieu D Vu
*Assistant Examiner* — Rami R Okasha
(74) *Attorney, Agent, or Firm* — John W. Branch; Branch Partners PLLC

(57) ABSTRACT

Embodiments are directed to a display engine that provides a graphical user interface (GUI) that includes a graph panel and a visualization panel may be generated. The graph panel may receive graph related inputs or interactions. Graph information based on the graph related inputs or interactions and a data source may be generated. A graph model based on the graph information and the data source may be generated. Elements that correspond to objects in the graph model or relationships in the graph model may be displayed in the graph panel. The graph information and the graph model may be employed to execute a query that provides a data model based on results of the query. The data model may be employed to provide a visualization that is displayed in the display panel.

28 Claims, 11 Drawing Sheets

(51) Int. Cl.
  *G06F 16/242* (2019.01)
  *G06F 3/0484* (2022.01)
  *G06F 16/25* (2019.01)
  *G06F 3/0482* (2013.01)

(52) U.S. Cl.
  CPC ........ *G06F 16/212* (2019.01); *G06F 16/2425* (2019.01); *G06F 16/2428* (2019.01); *G06F 16/252* (2019.01)

(58) Field of Classification Search
  CPC .... G06F 3/0484; G06F 3/0482; G06F 3/0486; G06F 3/04886
  See application file for complete search history.

(56) References Cited

U.S. PATENT DOCUMENTS

| | | | | |
|---|---|---|---|---|
| 8,286,087 | B1* | 10/2012 | Xian | G06F 8/34 715/765 |
| 9,383,913 | B2* | 7/2016 | Hoyer | G06F 3/0488 |
| 9,489,119 | B1* | 11/2016 | Smith, Jr. | G06F 40/117 |
| 9,760,240 | B2 | 9/2017 | Maheshwari et al. | |
| 9,881,066 | B1* | 1/2018 | Yousaf | G06F 3/0482 |
| 10,275,265 | B1* | 4/2019 | Gould | G05B 19/05 |
| 10,705,695 | B1* | 7/2020 | Porath | G06F 3/0482 |
| 10,783,162 | B1 | 9/2020 | Montague et al. | |
| 2004/0205562 | A1 | 10/2004 | Rozek et al. | |
| 2006/0064674 | A1* | 3/2006 | Olson, Jr. | G06F 8/34 717/113 |
| 2008/0126987 | A1* | 5/2008 | Meschian | G06Q 10/06 715/825 |
| 2009/0006939 | A1 | 1/2009 | DeSpain et al. | |
| 2009/0007122 | A1* | 1/2009 | Peyton | G06F 7/00 707/999.005 |
| 2010/0114629 | A1 | 5/2010 | Adler et al. | |
| 2010/0235771 | A1* | 9/2010 | Gregg, III | G06T 11/206 715/769 |
| 2010/0313157 | A1* | 12/2010 | Carlsson | G06F 3/0484 715/769 |
| 2010/0318583 | A1* | 12/2010 | Cohen | G06F 16/2428 707/805 |
| 2011/0219321 | A1 | 9/2011 | Gonzalez Veron et al. | |
| 2012/0311497 | A1* | 12/2012 | Bear | G06F 3/0482 715/823 |
| 2014/0026084 | A1* | 1/2014 | Gilboa | G06F 40/103 715/763 |
| 2014/0058789 | A1* | 2/2014 | Doehring | G06Q 10/067 705/7.27 |
| 2014/0074888 | A1* | 3/2014 | Potter | G06F 16/2428 707/779 |
| 2014/0215405 | A1* | 7/2014 | Breedvelt-Schouten | G06Q 10/06 715/841 |
| 2014/0267287 | A1* | 9/2014 | Dodgen | G06F 3/048 345/440 |
| 2014/0330821 | A1* | 11/2014 | Tullis | G06F 16/2425 707/728 |
| 2014/0372956 | A1 | 12/2014 | Bisca et al. | |
| 2015/0112998 | A1* | 4/2015 | Shankar | G06F 16/2452 707/741 |
| 2015/0339263 | A1 | 11/2015 | Abu El Ata et al. | |
| 2015/0347091 | A1* | 12/2015 | Ferko | G06F 8/10 717/105 |
| 2016/0078361 | A1 | 3/2016 | Brueckner et al. | |
| 2016/0103908 | A1 | 4/2016 | Fletcher et al. | |
| 2016/0224532 | A1* | 8/2016 | Miller | G06F 16/00 |
| 2016/0224616 | A1* | 8/2016 | Beacom | G06F 16/2455 |
| 2016/0314605 | A1* | 10/2016 | Filippi | G06F 16/9038 |
| 2017/0010787 | A1* | 1/2017 | Ranganathan | G06F 3/0482 |
| 2017/0075557 | A1 | 3/2017 | Noble et al. | |
| 2017/0091317 | A1* | 3/2017 | Cummings | G06F 16/2433 |
| 2017/0102694 | A1* | 4/2017 | Enver | G05B 19/4184 |
| 2017/0103103 | A1* | 4/2017 | Nixon | G06F 16/2471 |
| 2017/0140068 | A1* | 5/2017 | Oh | G06F 16/90335 |
| 2017/0154088 | A1* | 6/2017 | Sherman | G06F 16/212 |
| 2017/0177681 | A1* | 6/2017 | Potiagalov | G06F 16/26 |
| 2017/0177744 | A1* | 6/2017 | Potiagalov | G06F 16/904 |
| 2017/0178368 | A1* | 6/2017 | Noon | G06T 11/206 |
| 2017/0193049 | A1 | 7/2017 | Grehant | |
| 2017/0213131 | A1* | 7/2017 | Hammond | G06N 3/008 |
| 2017/0220633 | A1* | 8/2017 | Porath | G06F 9/542 |
| 2017/0286526 | A1* | 10/2017 | Bar-Or | G06F 8/60 |
| 2017/0293666 | A1 | 10/2017 | Ragavan et al. | |
| 2017/0316355 | A1* | 11/2017 | Shrestha | G06F 40/186 |
| 2018/0024731 | A1* | 1/2018 | Sanches | G06F 8/38 715/763 |
| 2018/0067998 | A1 | 3/2018 | Sherman et al. | |
| 2018/0129369 | A1 | 5/2018 | Kim et al. | |
| 2018/0218050 | A1* | 8/2018 | Porath | G06F 16/2477 |
| 2018/0260106 | A1* | 9/2018 | Leonard | G06F 3/04847 |
| 2018/0260903 | A1 | 9/2018 | Callery | |
| 2019/0034489 | A1* | 1/2019 | Ziegler | G06F 16/248 |
| 2019/0095395 | A1* | 3/2019 | Piecko | G06F 16/2457 |
| 2019/0286668 | A1 | 9/2019 | Puzicha et al. | |
| 2019/0294720 | A1* | 9/2019 | Beringer | G06F 3/0483 |
| 2019/0325292 | A1* | 10/2019 | Remis | G06F 16/9024 |
| 2019/0332599 | A1* | 10/2019 | Woo | G06F 16/2477 |
| 2019/0384836 | A1 | 12/2019 | Roth et al. | |
| 2020/0104401 | A1* | 4/2020 | Burnett | G06N 20/00 |
| 2020/0104402 | A1* | 4/2020 | Burnett | G06F 16/243 |
| 2020/0175006 | A1 | 6/2020 | Hughes | |
| 2020/0285803 | A1 | 9/2020 | Edge et al. | |
| 2020/0372057 | A1 | 11/2020 | Tonkin et al. | |
| 2020/0401623 | A1 | 12/2020 | Dilts et al. | |
| 2021/0263900 | A1 | 8/2021 | Joyce et al. | |
| 2021/0390420 | A1* | 12/2021 | Barnett | G06N 5/02 |

OTHER PUBLICATIONS

Von Landesberger et al., "A System for Interactive Visual Analysis of Large Graphs Using Motifs in Graph Editing and Aggregation", VMV 2009, pp. 1-9.
Office Communication for U.S. Appl. No. 16/725,986 dated Apr. 2, 2021, pp. 1-23.
Papenbrock. Thorsten et al., "Data-driven Schema Normalization," in Proceedings of the 20th International Conference on Extending Database Technology, 2017, pp. 342-353.
Office Communication for U.S. Appl. No. 16/984,014 dated Aug. 10, 2021, pp. 1-32.
Furmanova, Katarina et al., "Taggle: Scalable Visualization of Tabular Data through Aggregation," IEEE Transactions on Visualization and Computer Graphics, 2017, pp. 1-14.
Brunel, Robert et al., "Supporting Hierarchical Data in SAP HANA," 2015 IEEE 31st International Conference on Data Engineering (ICDE), 2015, pp. 1-12.
Office Communication for U.S. Appl. No. 17/091,536 dated Sep. 30, 2021, pp. 1-10.
Office Communication for U.S. Appl. No. 17/091,536 dated Nov. 5, 2021, pp. 1-25.
Office Communication for U.S. Appl. No. 16/944,043 dated Nov. 26, 2021, pp. 1-49.
Office Communication for U.S. Appl. No. 16/984,014 dated Jan. 3, 2022, pp. 1-31.
Office Communication for U.S. Appl. No. 16/984,014 dated Mar. 18, 2022, pp. 1-5.
Office Communication for U.S. Appl. No. 16/944,043 dated Apr. 19, 2022, pp. 1-10.
Office Communication for U.S. Appl. No. 16/984,014 dated Apr. 20, 2022, pp. 1-33.
Office Communication for U.S. Appl. No. 17/091,536 dated Apr. 25, 2022, pp. 1-32.
Office Communication for U.S. Appl. No. 17/091,536 dated Jul. 7, 2022, pp. 1-5.
Office Communication for U.S. Appl. No. 17/091,536 dated Aug. 16, 2022, pp. 1-38.
Gillis, Alexander S. et al., "What is integrated development environment (IDE)?—Definition from WhatIs.com," Sep. 2018, TechTarget,

(56) References Cited

OTHER PUBLICATIONS https://www.techtarget.com/searchsoftwarequality/definition/integrated-development-environment, Accessed: Aug. 16, 2022, pp. 1-4.
Office Communication for U.S. Appl. No. 17/370,367 dated Sep. 1, 2022, pp. 1-13.
International Search Report and Written Opinion for International Patent Application No. PCT/US2022/034283 dated Oct. 27, 2022, pp. 1-12.

* cited by examiner

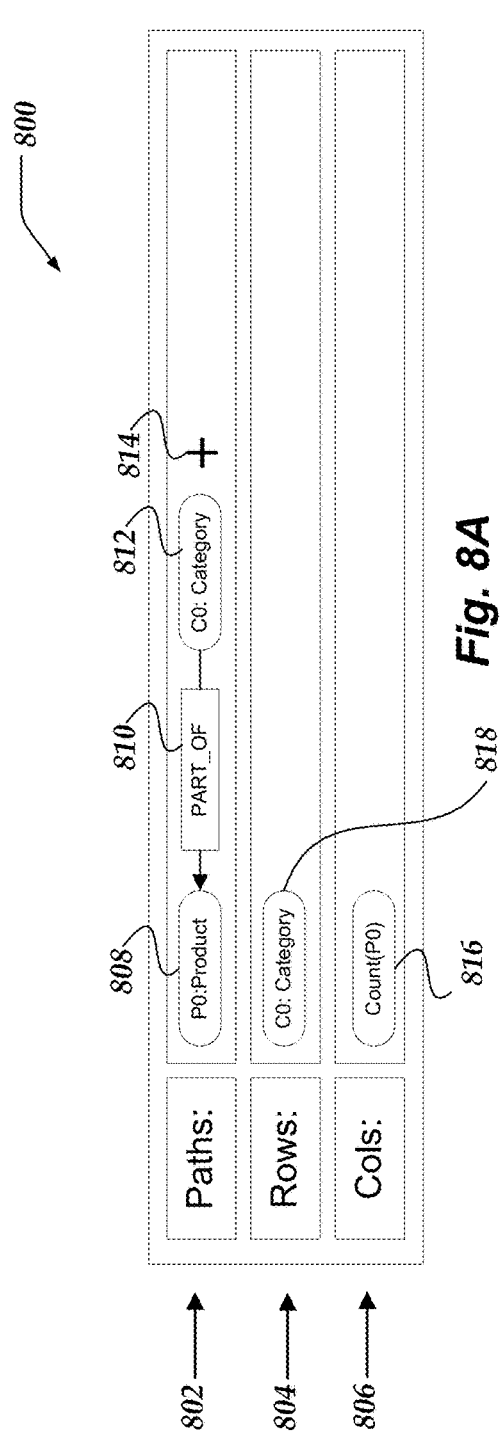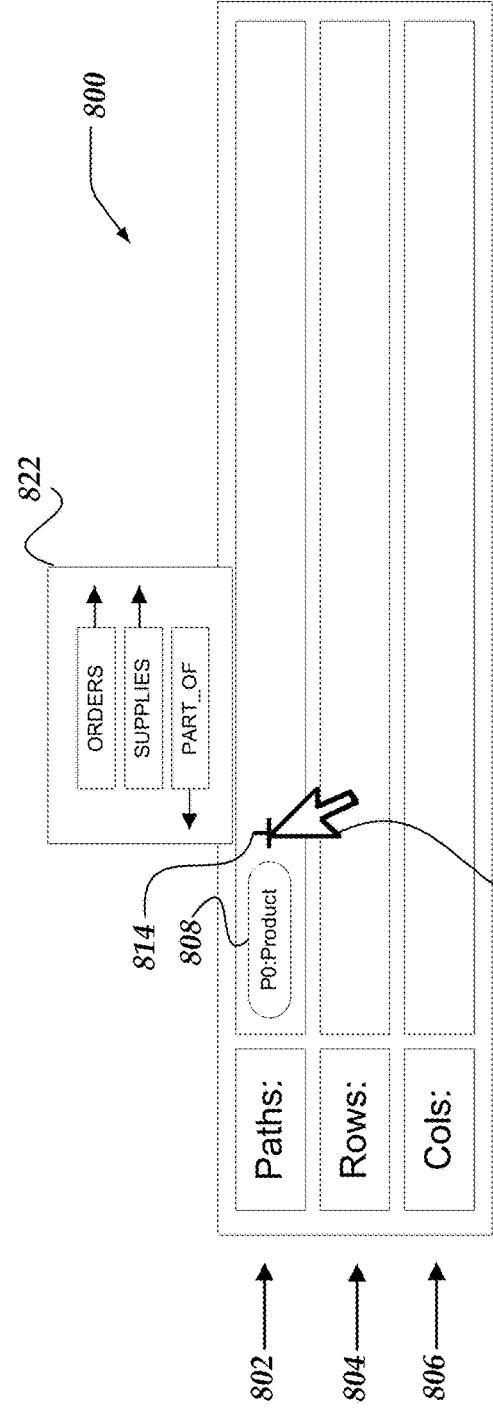

US 11,651,003 B2

INTERACTIVE DATA VISUALIZATION INTERFACE FOR DATA AND GRAPH MODELS

TECHNICAL FIELD

The present invention relates generally to data visualization, and more particularly, but not exclusively to, managing the display of objects included in the data visualization.

BACKGROUND

Organizations are generating and collecting an ever increasing amount of data. This data may be associated with disparate parts of the organization, such as, consumer activity, manufacturing activity, customer service, server logs, or the like. For various reasons, it may be inconvenient for such organizations to effectively utilize their vast collections of data. In some cases the quantity of data may make it difficult to effectively utilize the collected data to improve business practices. In some cases, organizations employ various tools to generate visualizations of the some or all of their data. Employing visualizations to represent this data enables organizations to improve their understanding of critical business operations and help monitor key performance indicators. However, in some cases, the underlying data employed for generating visualizations may be represented using graph-based databases. Accordingly, using visualization tools designed for relational database management systems may be disadvantageous. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein:

FIG. 8A illustrates one or more of the features of a query panel in accordance with one or more of the various embodiments;

FIG. 8B illustrates a how a display engine may automatically display information that may enable a user to provide a query path that may be employed to generate query information in accordance with one or more of the various embodiments;

DETAILED DESCRIPTION OF THE VARIOUS EMBODIMENTS

Figure 1:
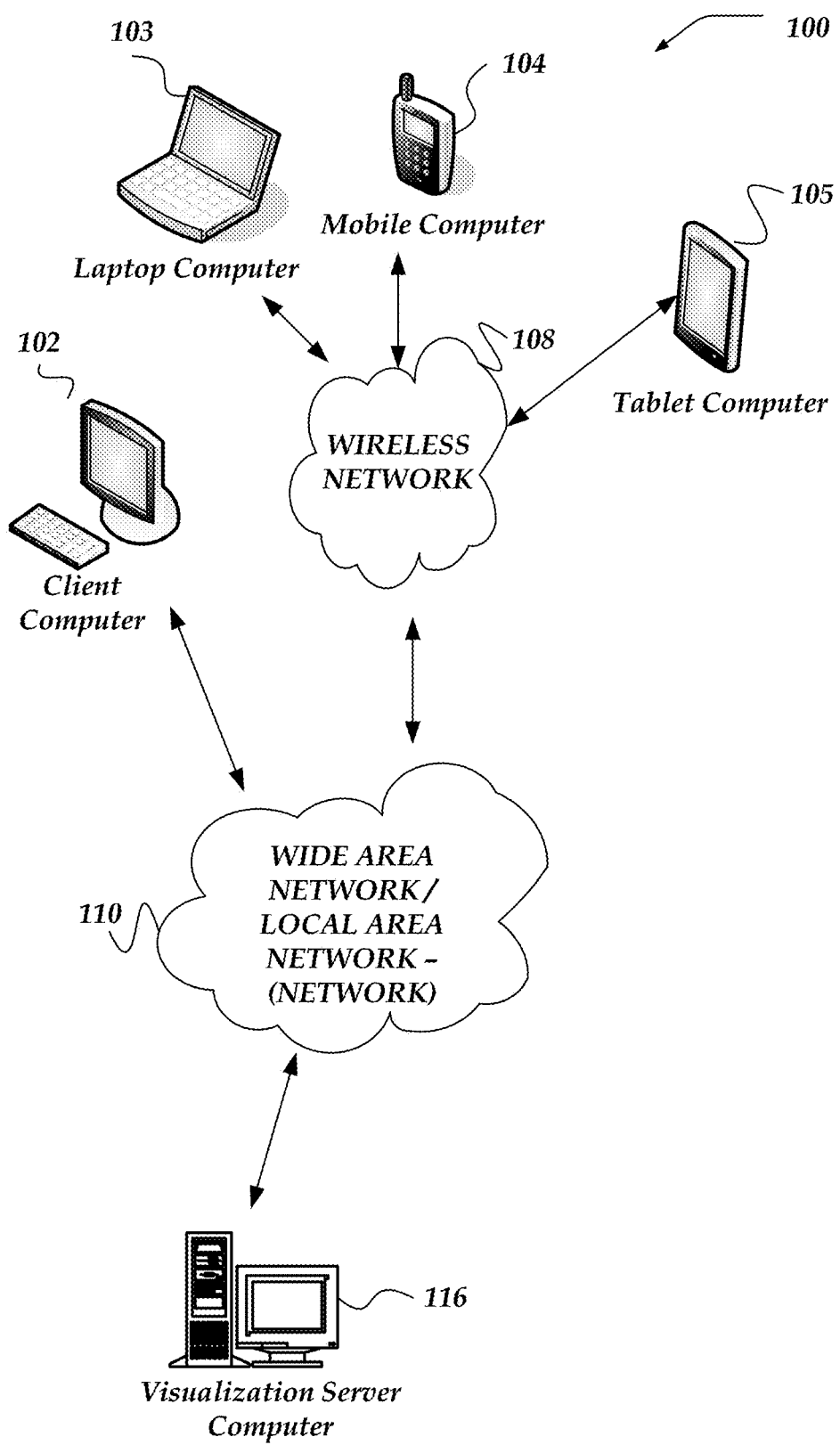
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, Kotlin, PHP, Perl, JavaScript, Ruby, VBScript, Microsoft.NET™ languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine. Also, in some embodiments, one or more portions of an engine may be a hardware device, ASIC, FPGA, or the like, that performs one or more actions in the support of an engine or as part of the engine.

As used herein the term "data source" refers to the source of the underlying information that is being visualized or otherwise analyzed. Data sources may include information from or provided by databases (e.g., relational, graph-based, no-sql, or the like), file systems, unstructured data, streams, or the like. Data sources are typically arranged to model various operations or activities associated with an organization. In some cases, data sources are arranged to provide or facilitate various data-focused actions, such as, efficient storage, queries, indexing, search, updates, or the like. Generally, a data source may be arranged to provide features related to data manipulation or data management rather than providing an easy to understand presentation or visualizations of the data.

As used herein the term "graph model" refers to one or more data structures that may be comprised of one or more nodes and one or more edges to represent data objects and relationships between or among them. Nodes may be associated with one or more data objects and edges may be associated with one or more relationships between the data objects.

As used herein the term "data model" refers to one or more data structures that represent one or more entities (e.g., data objects) that may be selectively included in visualizations. The information comprising data objects may be retrieved from one or more data sources based on queries that may be associated with a graph model As used herein the term "data object" refers to one or more entities or data structures that comprise data models. In some cases, data objects may be considered portions of the data model. Data objects may represent individual instances of items or classes or kinds of items.

As used herein the term "visualization model" refers to one or more data structures that represent one or more representations of a data model that may be suitable for use in a visualization that is displayed on one or more hardware displays. Visualization models may define styling or user interface features that may be made available to non-authoring user.

As used herein the term "visualization object" refers to one or more data structures that comprise visualization models. In some cases, visualization objects may be considered portions of the visualization model. visualization objects may represent individual instances of items or entire classes or kinds of items that may be displayed in a visualization.

As used herein the term "panel" refers to region within a graphical user interface (GUI) that has a defined geometry (e.g., x, y, z-order) within the GUI. Panels may be arranged to display information to users or to host one or more interactive controls. The geometry or styles associated with panels may be defined using configuration information, including dynamic rules. Also, in some cases, users may be enabled to perform actions on one or more panels, such as, moving, showing, hiding, re-sizing, re-ordering, or the like.

As used herein the term "graph information" refers to information that may be employed to define or generate a graph model. In some cases, graph information may include information that identifies nodes, edges, or the like, that may be associated with a graph model derived from a data source. In some cases, graph information may be used to generate query information that may be employed to select objects from a data source.

As used herein, the term "graph element" refers to user interface display representations of data objects, relationships, filters, or the like, that may be translated or mapped into graph information.

As used herein the term "query information" refers to information that may be provided to data provider, such as, a database, for executing a query. Query information may include, but is not limited to, one or more query expressions or statements represented using one or more well-known or custom query languages, such as, Structured Query Language (SQL), Cypher, GraphQL, Asterix Query Language (AQL), or the like.

As used herein, the term "graph element" refers to user interface display representations of data objects, relationships, filters, or the like, that may be translated or mapped into graph information.

As used herein the term "configuration information" refers to information that may include rule based policies, pattern matching, scripts (e.g., computer readable instructions), or the like, that may be provided from various sources, including, configuration files, databases, user input, built-in defaults, or the like, or combination thereof.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to visualizing data using a network computers. In one or more of the various embodiments, a graphical user interface (GUI) that includes a graph panel and a visualization panel may be generated such that the graph panel may be arranged to receive one or more graph related inputs or interactions. In one or more of the various embodiments, generating the GUI, further includes providing a model feature panel that displays a list of object identifiers and relationship identifiers that correspond to one or more objects and one or more relationships included in the graph model or the data model.

In one or more of the various embodiments, generating the GUI may include: providing a result inspection panel that may display a list of object instances based on the execution of the query and the graph model; and automatically updating the list of object instances based on the execution of the other query and the graph model.

In one or more of the various embodiments, generating the GUI may include: generating an object detail panel that may displays one or more attributes associated with the one or more objects;

and automatically updating the attributes displayed in the object detail panel based on an object that is selected in the GUI.

In one or more of the various embodiments, graph information based on the one or more graph related inputs or interactions and a data source may be generated. In one or more of the various embodiments, generating the graph information may include: modifying the graph information based on one or more filters such that the one or more filters may be displayed in a filter panel on the GUI; and employing the modified graph information to execute the query.

In one or more of the various embodiments, a graph model based on the graph information and the data source may be generated such that the graph model may be comprised of nodes that represent objects and edges that represent relationships between two or more objects.

In one or more of the various embodiments, one or more elements that correspond to one or more objects in the graph model or one or more relationships in the graph model may be displayed in the graph panel. In one or more of the various embodiments, displaying the one or more elements in the graph panel includes: displaying an interactive marker in the GUI; and in response to a selection of the interactive marker, automatically displaying a menu panel that lists each object or each relationship based on the graph model such that each object or each relationship may be eligible to include in the graph path.

In one or more of the various embodiments, the one or more elements in the graph panel may include: displaying one or more row elements in a row field in the graph panel that correspond to one or more of the one or more objects, one or more other objects in the graph model, or one or more functions that are employed to provide row information for the visualization; and displaying one or more column elements in a column field in the graph panel that correspond to one or more of the one or more objects, one or more other designated objects, or the one or more functions that are employed to provide column information for the visualization.

In one or more of the various embodiments, the graph information and the graph model may be employed to execute a query that provides a data model based on one or more results of the query such that the data model is employed to provide a visualization that is displayed in the display panel.

In one or more of the various embodiments, in response to a modification to the graph information, the modified graph information may be employed to provide a modified graph model and execute another query that may provide a modified data model based on one or more results of the other query such that the modified data model is automatically employed to provide a modified visualization that automatically replaces the visualization in the display panel.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)—(network) 110, wireless network 108, client computers 102-105, visualization server computer 116, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or organization to perform a variety of services for the business or other organization. For example, client computers 102-105 may be configured to operate as a web server, firewall, client application, media player, mobile telephone, game console, desktop computer, or the like. However, client computers 102-105 are not constrained to these services and may also be employed, for example, for end-user computing in other embodiments. It should be recognized that more or fewer client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CSS), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, document validation server computer 116, document management server computer 118, or other computers.

Client computers 102-105 may further be configured to include a client application that enables an end-user to log into an end-user account that may be managed by another computer, such as document validation server computer 116, document management server computer 118, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, or results provided by document validation server computer 116.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, document validation server computer 116, document management server computer 118, client computers 102, and client computers 103-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

Also, one embodiment of visualization server computer 116 is described in more detail below in conjunction with FIG. 3. Although FIG. 1 illustrates visualization server computer 116 as a single computer, the innovations or embodiments are not so limited. For example, one or more functions of visualization server computer 116, or the like, may be distributed across one or more distinct network computers. Moreover, in one or more embodiments, visualization server computer 116 may be implemented using a plurality of network computers. Further, in one or more of the various embodiments, visualization server computer 116, or the like, may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
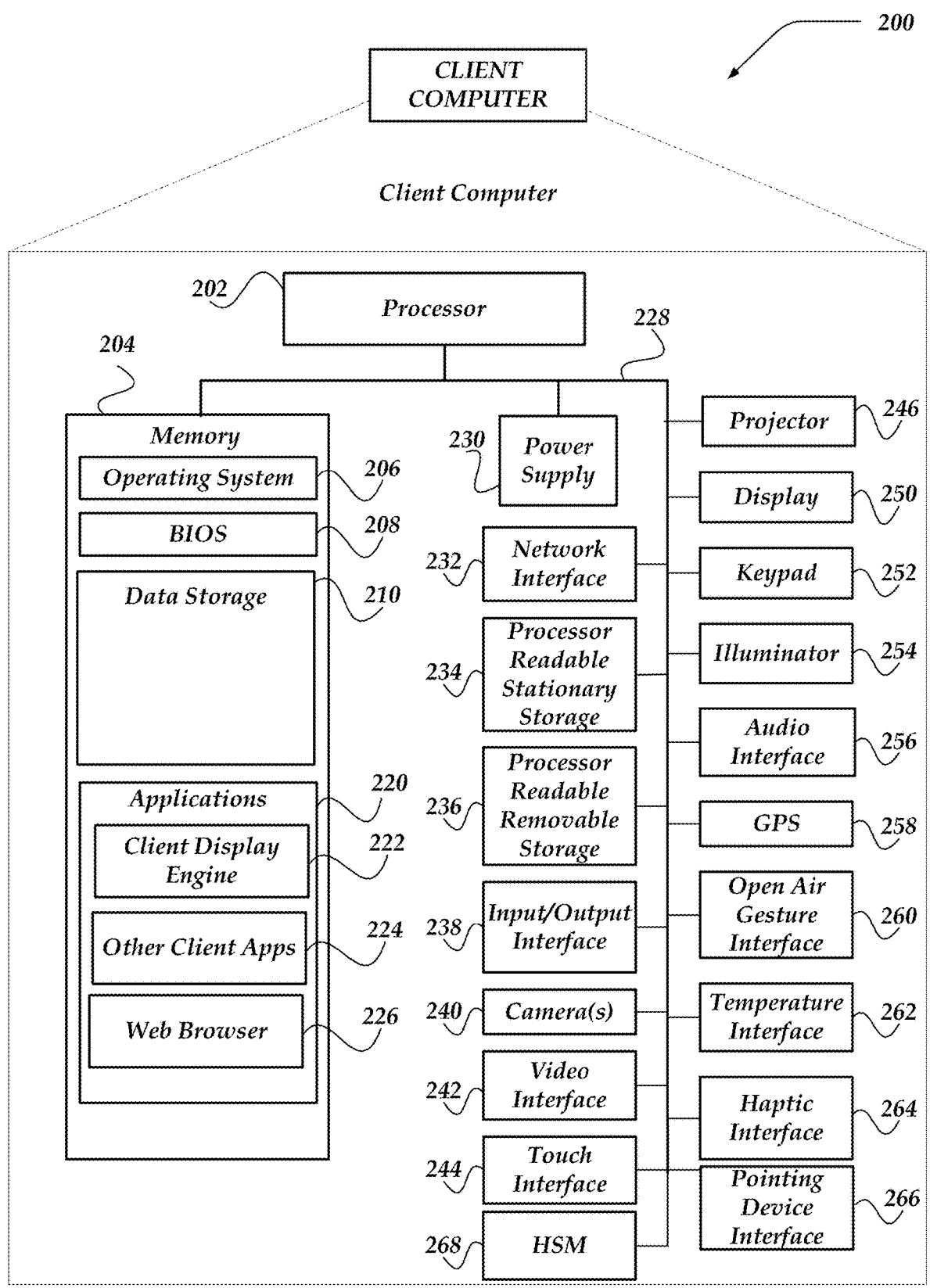
FIG. 2 illustrates a schematic embodiment of a client computer.

FIG. 2 shows one embodiment of client computer 200 that may include many more or less components than those shown. Client computer 200 may represent, for example, one or more embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (MC).

Audio interface 256 may be arranged to produce and receive audio signals such as the sound of a human voice. For example, audio interface 256 may be coupled to a speaker and microphone (not shown) to enable telecommunication with others or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiment, however, client computer 200 may, through other components, provide other information that may be employed to determine a physical location of the client computer, including for example, a Media Access Control (MAC) address, IP address, and the like.

In at least one of the various embodiments, applications, such as, operating system 206, client display engine 222, other client apps 224, web browser 226, or the like, may be arranged to employ geo-location information to select one or more localization features, such as, time zones, languages, currencies, calendar formatting, or the like. Localization features may be used in documents, visualizations, display objects, display models, action objects, user-interfaces, reports, as well as internal processes or databases. In at least one of the various embodiments, geo-location information used for selecting localization information may be provided by GPS 258. Also, in some embodiments, geolocation information may include information provided using one or more geolocation protocols over the networks, such as, wireless network 108 or network 111.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or LINUX™, or a specialized client computer communication operating system such as Windows Phone™, Android™, or the IOS operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, client display engine 222, other client applications 224, web browser 226, or the like. Client computers may be arranged to exchange communications, such as, queries, searches, messages, notification messages, event messages, alerts, performance metrics, log data, API calls, or the like, combination thereof, with visualization server computers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 200 may include one or more hardware microcontrollers instead of CPUs. In one or more embodiment, the one or more microcontrollers may directly execute their own embedded logic to perform actions and access its own internal memory and its own external Input and Output Interfaces (e.g., hardware pins or wireless transceivers) to perform actions, such as System On a Chip (SOC), or the like.

Illustrative Network Computer

Figure 3:
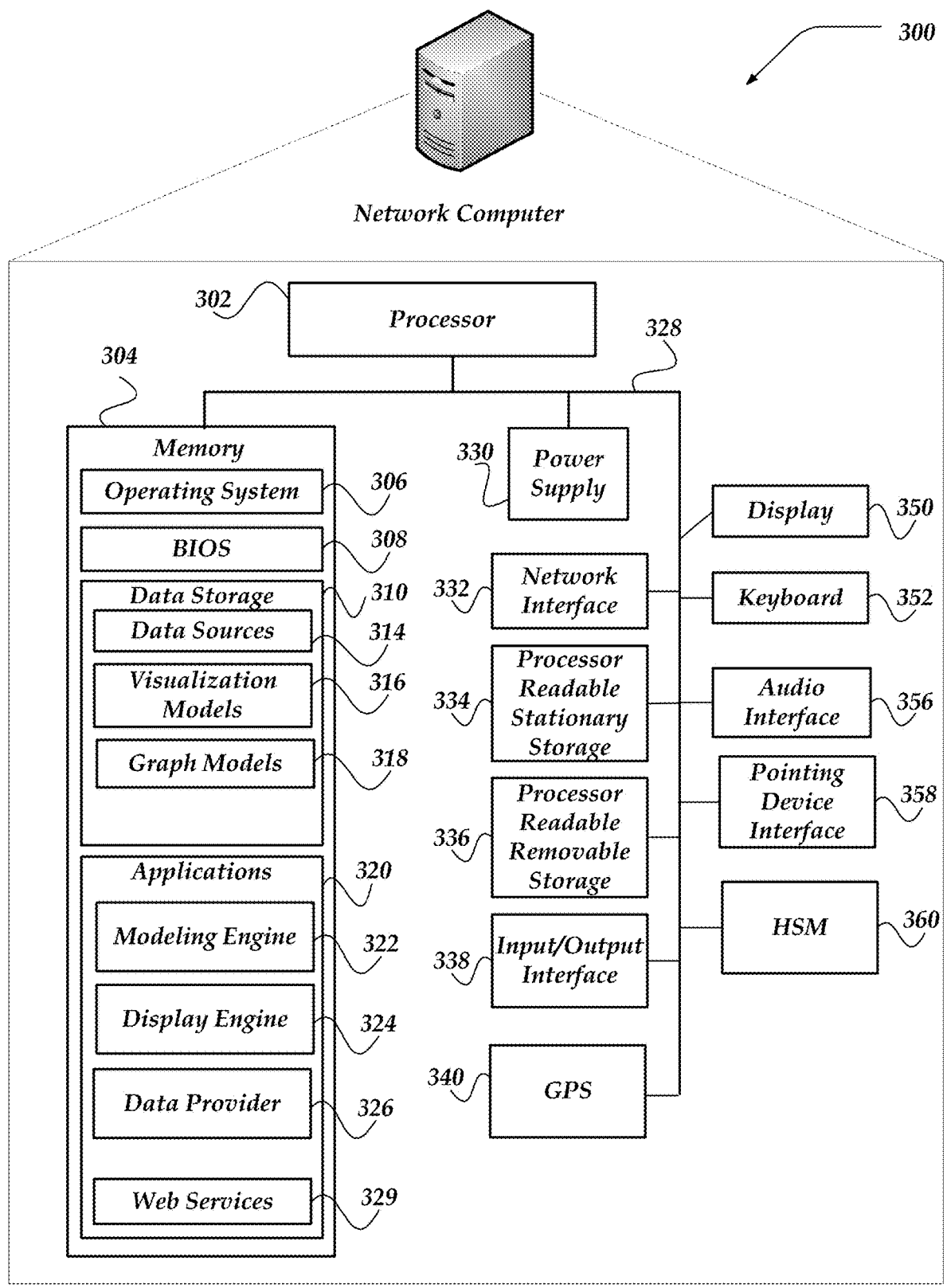
FIG. 3 illustrates a schematic embodiment of a network computer.

FIG. 3 shows one embodiment of network computer 300 that may be included in a system implementing one or more of the various embodiments. Network computer 300 may include many more or less components than those shown in FIG. 3. However, the components shown are sufficient to disclose an illustrative embodiment for practicing these innovations. Network computer 300 may represent, for example, one embodiment of one or more visualization server computer 116 of FIG. 1.

Network computers, such as, network computer 300 may include a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, tri-angulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiments, however, network computer 300 may, through other components, provide other information that may be employed to determine a physical location of the client computer, including for example, a Media Access Control (MAC) address, IP address, and the like.

In at least one of the various embodiments, applications, such as, operating system 306, modeling engine 322, display engine 324, data provider 326, web services 329, or the like, may be arranged to employ geo-location information to select one or more localization features, such as, time zones, languages, currencies, currency formatting, calendar formatting, or the like. Localization features may be used in documents, file systems, user-interfaces, reports, display objects, display models, visualizations as well as internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or LINUX™, or a specialized operating system such as Microsoft Corporation's Windows® operating system, or the Apple Corporation's OSX® operating system. The operating system may include, or interface with one or more virtual machine modules, such as, a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, data models 314, display models 316, graph models 318, or the like. Data models 314 may store files, documents, versions, properties, meta-data, data structures, or the like, that represent one or more portions of one or more data models. Display models 316 may store display models. Graph models 318 may represent memory used for storing graph models.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include modeling engine 322, display engine 324, data provider 326, web services 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, modeling engine 322, display engine 324, data provider 326, web services 329, or the like, may be operative in a cloud-based computing environment. In one or more of the various embodiments, these applications, and others, that comprise the management platform may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to modeling engine 322, display engine 324, data provider 326, web services 329, or the like, may be provisioned and de-commissioned automatically.

Also, in one or more of the various embodiments, modeling engine 322, display engine 324, data provider 326, web services 329, or the like, may be located in virtual servers running in a cloud-based computing environment rather than being tied to one or more specific physical network computers.

Further, network computer 300 may also include hardware security module (HSM) 360 for providing additional tamper resistant safeguards for generating, storing or using security/cryptographic information such as, keys, digital certificates, passwords, passphrases, two-factor authentication information, or the like. In some embodiments, hardware security module may be employ to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In one or more embodiment, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
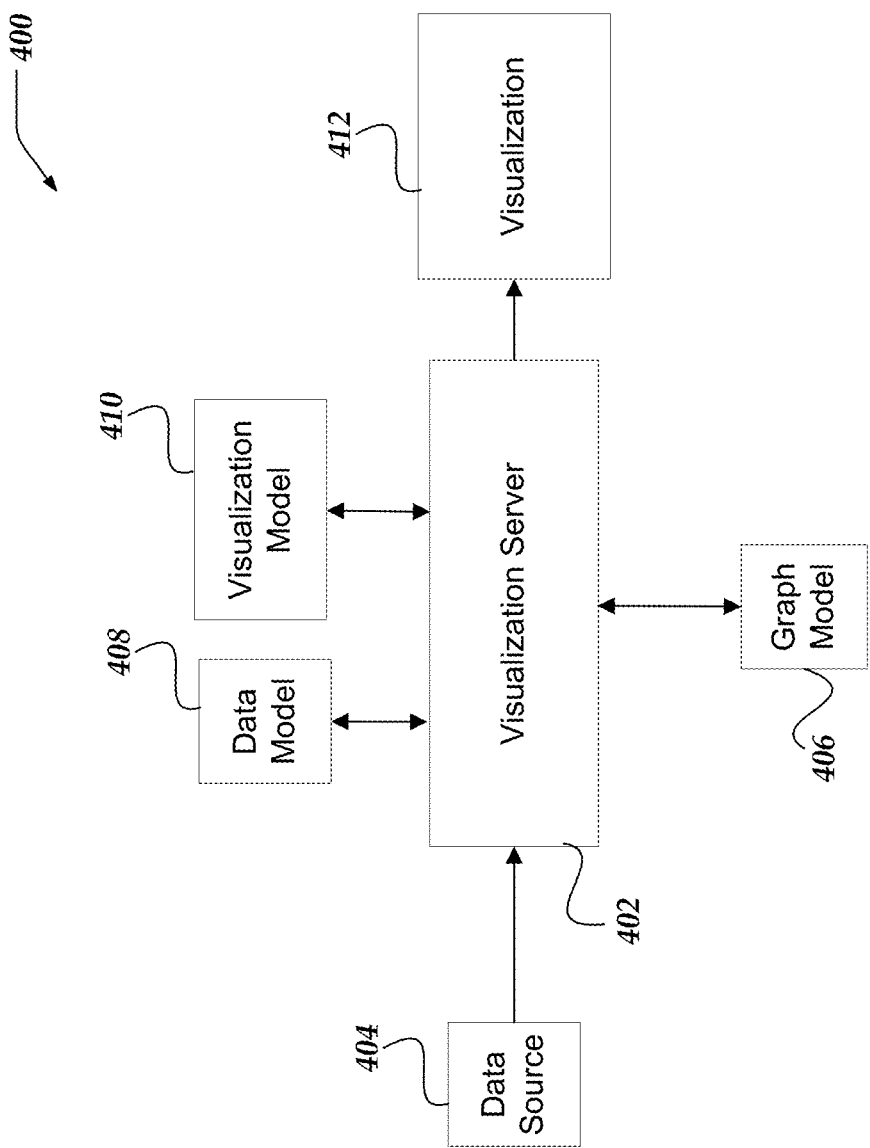
FIG. 4 illustrates a logical architecture of a system for interactive data visualization in accordance with one or more of the various embodiments.

FIG. 4 illustrates a logical architecture of system 400 for interactive data visualization in accordance with one or more of the various embodiments. In one or more of the various embodiments, system 400 may include various components, such as, visualization server 402, data source 404, graph model 406, data model 408, visualization model 410, visualization 412, or the like.

In one or more of the various embodiments, configuration information, including user input, may be employed to select one or more portions of the data source 404 may be that may be provided to visualization server 402 for interactive data visualization.

In one or more of the various embodiments, visualization server 402 may be arranged to generate data model 408 based on graph model 406. Accordingly, in some embodiments, data model 408 may be employed by visualization server 402 to generate a visualization model, such as, visualization model 410, based on a graph query.

In some embodiments, a modeling engine, such as, modeling engine 322 may be employed to transform some or all of graph model 406 into data model 408. In some embodiments, the modeling engine may be arranged to employ or execute computer readable instructions provided by configuration information to determine some or all of the steps for transforming graph models into data models. In general, the modeling engine may be arranged to generate a data model that includes data objects or attributes such that each node in the graph model may be associated with an data object in a data model. Also, in one or more of the various embodiments, some or all of the edges that may be associated with relationships between the nodes in the graph model may be represented as relationships in the data model. Further, in one or more of the various embodiments, graph model 406 may be employed to generate a query that provides the data objects for data model 408 if executed against data source 404.

In one or more of the various embodiments, visualization model 410 may be based on data model 408. In some embodiments, a given visualization model, such as, visualization model 410 may include one or more visualization objects that may be arranged to represent various common, uncommon, or custom, visualization elements, such as, rows, columns, line plots, surface plots, bar charts, pie charts, tables, text fields, text areas, or the like, that may be included in visualizations, such as, visualization 412 to provide an improved understanding of the underlying data in data source 404. In some embodiments, visualizations may be targeted for different audiences, such as, customers, stakeholders, internal teams, business intelligence teams, or the like. Accordingly, more than one visualization model may be generated or associated with the same data model.

In one or more of the various embodiments, modification to graph model 406 may automatically trigger queries against data source 404 that may modify one or more or more of data model 408, visualization model 410, or visualization 412.

Figure 5:
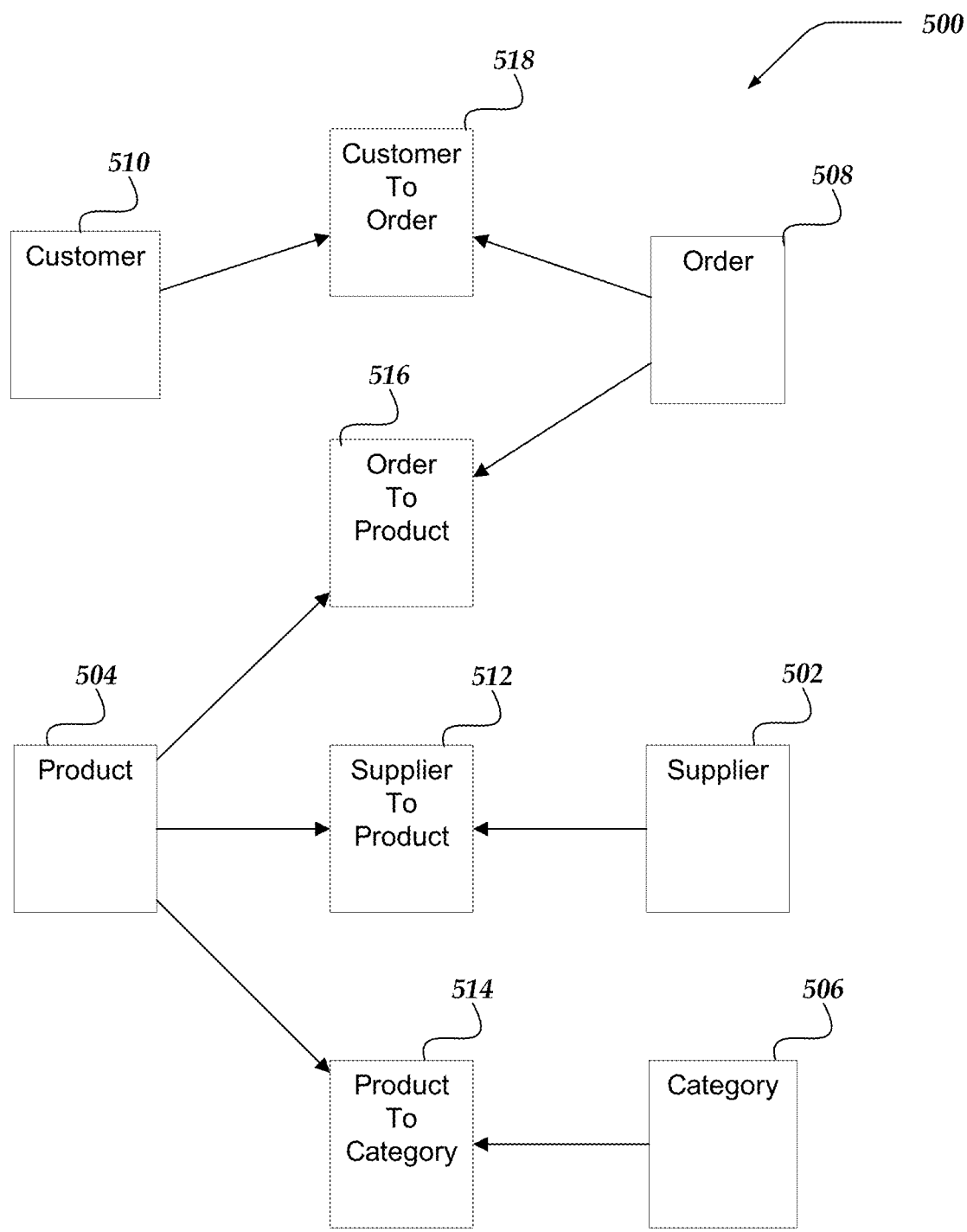
FIG. 5 illustrates a logical representation of a portion of a data source for interactive data visualization that may be in accordance with one or more of the various embodiments.

FIG. 5 illustrates a logical representation of a portion of data source 500 for interactive data visualization that may be in accordance with one or more of the various embodiments. In one or more of the various embodiments, data sources may include various types of databases with varying schema. Selecting the type of database or the design of the schema for a data source may be considered a design decision. In this example, data source 500 is represented as a conventional relational database with a normalized schema. Thus, in this example, data source 500 is comprised of data tables that are related to other data table using relation tables.

Accordingly, in this example, data source 500 includes, supplier table 502, product table 504, category table 506, order table 508, customer table 510, supplier-to-product table 512, product-to-category table 514, order-to-produce table 516, customer-to-order table 518.

Conventionally, in some embodiments, data tables such as, supplier table 502, product table 504, category table 506, order table 508, customer table 510, or the like, include columns that represent various attributes of the represented entities, including at least one column for storing record identifiers. For example, in some embodiments, customer table 510 may include columns such as first name, last name, region, and ID. Thus, each customer record in customer table 510 represents a customer and includes information about that customer in the record as per the columns defines in customer table 510.

In this example, relationship between the entities represent by the data table may be represented by storing identifier tuples in the relevant relation table. For example, customer-to-order table 518 may include a column for storing customer IDs and a column for storing order IDs. Accordingly, in this example, records in customer-to-order table 518 may include an ID of a customer and an ID of an order. Thus, in this example, among other things, data source 500 may be employed to track or otherwise maintain the association of customer to orders. Similarly, in this example, data source 500 enables other associations represented by the other tables.

One of ordinary skill in the art will appreciate that data source 500 is provided to illustrate or describe one or more features of the various embodiments. One of ordinary skill in the art will appreciate that the innovations described herein may apply to various data sources, including data sources that may be far more complex than data source 500. However, even though data source 500 has been deliberately simplified for brevity and clarity, it is at least sufficient to enable one of ordinary skill the art to practice the disclosed innovations.

Figure 6:
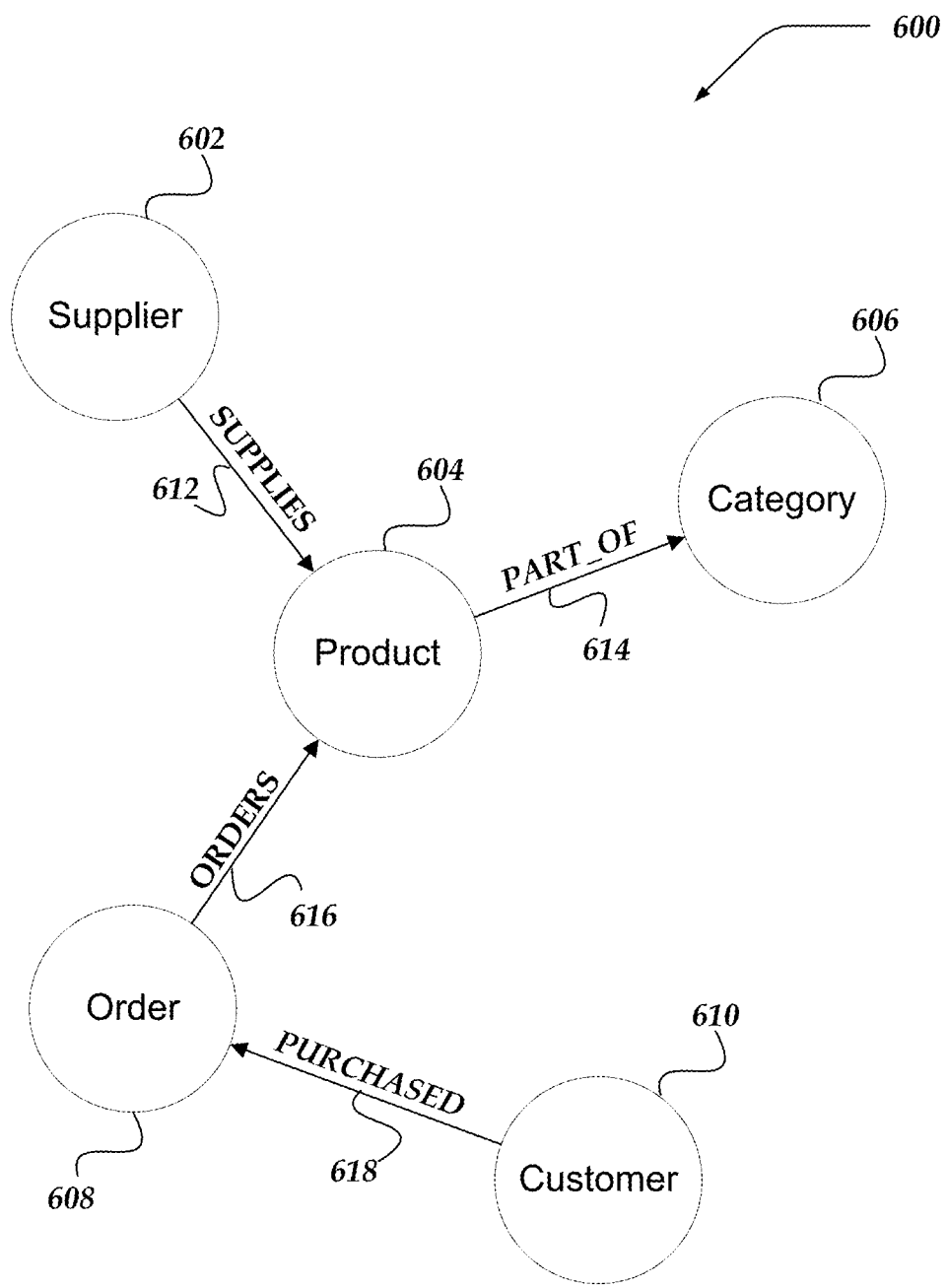
FIG. 6 illustrates a logical representation of a portion of a graph model for interactive graph-based data visualization that may be in accordance with one or more of the various embodiments.

FIG. 6 illustrates a logical representation of a portion of graph model 600 for interactive data visualization that may be in accordance with one or more of the various embodiments. Graph model 600 is included to illustrate how data in an data source may be represented in a graph model that may be in accordance with one or more of the various embodiments.

In this example, for some embodiments, node 602 may represent supplier objects, node 604 may represent product objects, node 606 may represent category objects, node 608 may represent order objects, and node 610 may represent customer objects.

In this example, for some embodiments, the edges represent various relationships between or among the various objects or entities in a data source that may be represented by graph model 600, including: edge 612 that may represent that supply objects provide (e.g., supplies) the products represented by node 604; edge 614 that may represent that product objects are grouped into categories that may be represented by node 606; edge 616 that may represent that order objects are associated with one or more products (e.g., the products included in an order) represented by node 604; and edge 618 that may represent the customer objects that have made purchases (e.g., purchased) that comprise the orders represented by node 608.

One of ordinary skill in the art will appreciate the graph model 600 is provided to illustrate or describe one or more features of the various embodiments. One of ordinary skill in the art will appreciate that the innovations described herein may apply to various graph models, including graph models that may be far more complex than graph model 600. However, even though graph model 600 has been deliberately simplified for brevity and clarity, it is at least sufficient to enable one of ordinary skill the art to practice the disclosed innovations.

Figure 7:
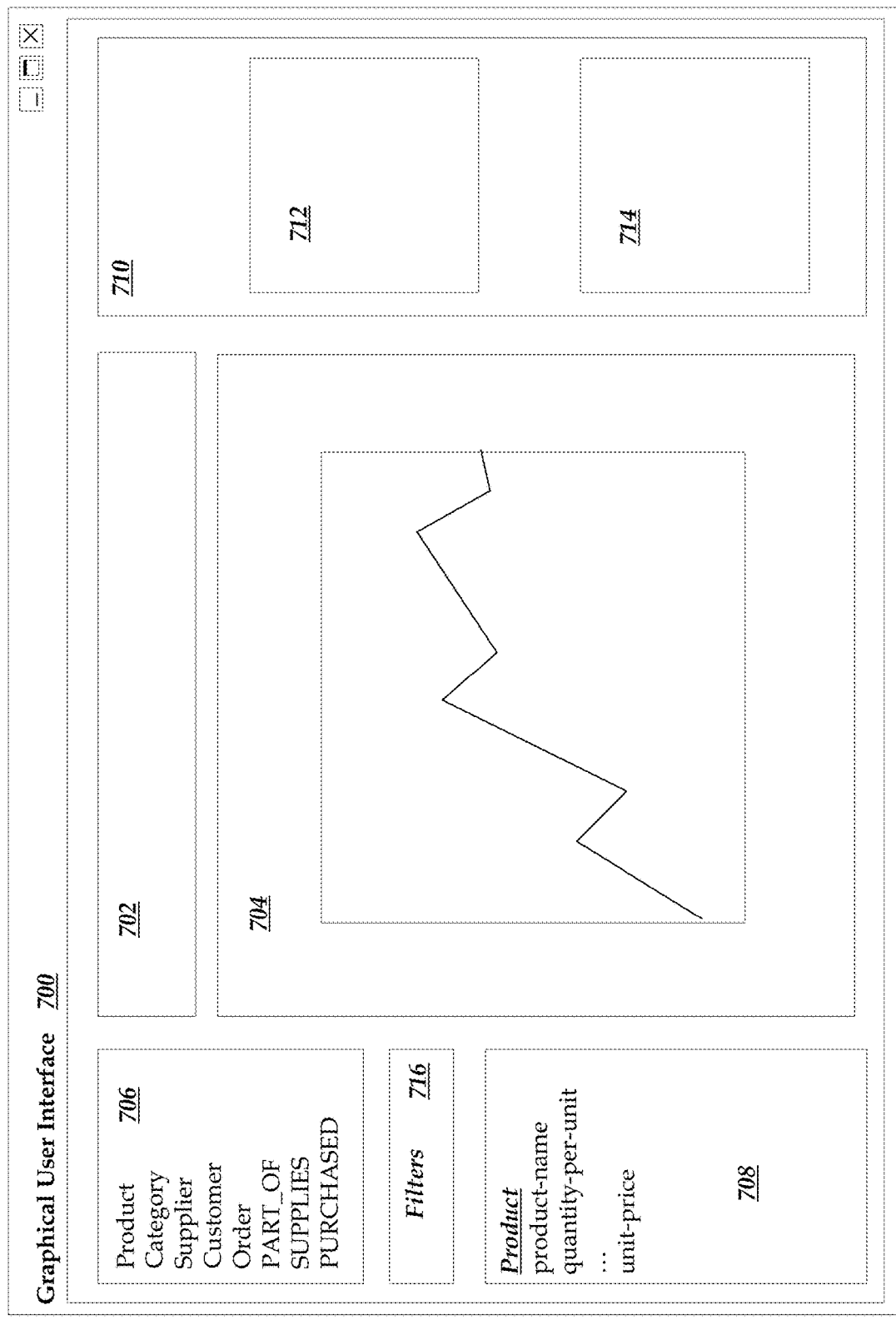
FIG. 7 illustrates a logical representation of a graphical user interface for interactive data visualization in accordance with one or more of the various embodiments.

FIG. 7 illustrates a logical representation of graphical user interface 700 for interactive data visualization in accordance with one or more of the various embodiments. In one or more of the various embodiments, a graphical user interface (GUI), such as, GUI 700, may be arranged to include one or more panels that may provide various features that enable interactive data visualization. In some embodiments, such panels may include, graph panel 702, display panel 704, model feature panel 706, selected object detail panel 708, results panel 710, filter panel 716, or the like. Further, in some embodiments, one or more panels may include or be comprised of one or more other panels. For example, in some embodiments, result inspection panel 710 may be arranged to include one or more result item panels, such as panel 712, panel 714, or the like.

In one or more of the various embodiments, the one or more panels included in GUI 700 may be arranged to reactively respond to one or more inputs or interactions provided via one or more other panels in the same GUI. For example, in some embodiments, inputs provided to graph panel 702 may automatically cause one or more other panels, such as, display panel 704, result inspection panel 710, or the like, or combination thereof, to automatically update based on the changes made to graph panel 702.

Also, in some embodiments, one or more panels may be arranged to be reactive to one or more local or remote external inputs provided by one or more backend services or data. For example, one or more of the panels may be arranged to observe state or values of one or more backend services, such as, a data in a data source. Accordingly, in this example, if changes are made to the observed data source, the one or more panels that may be configured to monitor or observe the data source may automatically update to reflect one or more of the changes made to the data source.

In one or more of the various embodiments, graph panel 702 may be arranged to collect various information for producing visualizations. Accordingly, in some embodiments, graph panel 702 may be arranged to provide interfaces for collecting inputs from users or other sources that may be employed to provide graph information. In some embodiments, graph panel 702 may automatically offer candidate graph information based on the graph model or other context. Also, in some embodiments, graph panel 702 may be arranged to provide interfaces for collecting inputs from users or other sources that may be employed to provide row information or column information that may be used for generating visualization models used for visualizations. In some cases, row information or column information may define the nodes or values that serve as rows or columns in a visualization Graph panels are described in more detail below (See, FIG. 8 and its associated description).

In some embodiments, a display engine may obtain some or all of the graph information as it is provided. Accordingly, in some embodiments, if the graph information includes enough information to execute a query, the display engine may be configured to automatically execute a query based on the current graph information.

In one or more of the various embodiments, display panel 704 may be arranged to display visualizations or other visual reports that may be associated with a data model and executed queries that are based on the graph information provided by via graph panel 702, or the like.

In one or more of the various embodiments, model feature panel 706 may be arranged to display information that describes some or all of the entities that comprise a data model, or other contextual or meta-data to provide overview information to user. In some embodiments, an model feature panel, such as, model feature panel 706 may be considered to be a report include data description information that may be associated with a data model.

In one or more of the various embodiments, object detail panels, such as, object detail panel 708 may be arranged to display detailed information about a particular data object in the data model. In some embodiments, the detailed information may include information that may be associated with a single instance of a data object that corresponds to a node in the graph model. For example, detailed information may include a list of fields, attributes, or attribute values that may be associated with one or more selected objects.

In one or more of the various embodiments, result inspection panels, such as, result inspection panel 710 may be arranged to display result information that may be associated with the execution of a query. In some embodiments, this may include results from a successful execution of the query or other information, such as, error messages, or the like. In one or more of the various embodiments, if the execution of a query that is based the current/active graph information produces results that include one or more objects or object instances, they may be displayed in result inspection panel 710. In some embodiments, result item panels, such as, result item panel 712 or result item panel 714 may include information associated with the results of a query, one or more objects or groups of object selected from other panels (e.g., selected directly from display panel 704, or the like). In some embodiments, each item may represent one or more of the objects returned by the query. Accordingly, in some embodiments, result item panel 712 or result item panel 714 may include detailed information that is associated with an individual result. Note, in some embodiments, items in this context may be considered analogous to individual records of a RDBMS database result set. For example, in some embodiments, if execution of a query based on the current graph information returns two items, item panel 712 may display information associated with a first item while item panel 714 may display information associated with a second item. In one or more of the various embodiments, the contents or format of item panels may be based on configuration information that defines formatting or styling for item panels.

Further, in one or more of the various embodiments, display engines may be arranged to modify or update the information shown in result inspection panel 710 based on user interactions with visualization objects or data objects that may be represented in visualizations shown in display panel 704. For example, in some embodiments, as users select objects in a visualization, display engines may automatically update result inspection panels based on the selection. In some embodiments, users may select one or more visualization objects that represent a group of data objects. Accordingly, in some embodiments, in response to such selections, display engines may update result inspection panels to show the group of selected objects.

Also, in one or more of the various embodiments, result inspection panels may be arranged to enable users to select or one or more result item panels. Accordingly, in some embodiments, display engines may be arranged to highlight representations of the same selected objects in other panels, including the visualizations. For example, if a user selects result item panel 712 in result inspection panel 710, the display engine may be arranged to highlight a portion of the visualization in display panel 704 that may be associated with the data objects associated with result item panel 712.

In some embodiments, objects shown in a result inspection panel may be selected and dragged to one or more other panels, such as, the graph panel or filter panel. Also, in some embodiments, one or more fields or attributes may be selected from objects shows in the result inspection panel and dragged to one or more other panels as well. In one or more of the various embodiments, filter panel 716 represents a panel that may enable users to view one or more filter functions or conditions that may be included in the graph information before a query is executed. In some embodiments, filter panels may be arranged to enable users to select, activate, enable, or disable, one or more filters or other functions that may be applied to the results of the execution of a query based on the graph information. In one or more of the various embodiments, as the graph information is modified, the display engine may be arranged to automatically adapt the types of filter functions that may be selected based on the current graph information. For example, if the graph information is related to orders, one or more filters may be provided or otherwise made available based on the fields or attributes that may be associated with an order object. Also, for example, in one or more of the various embodiments, if the data objects that correspond to orders or order type include a delivery address, the display engine may be arranged to make available a filter for selecting results based on delivery location information, such as, state, country, postal code, or the like. Thus, in this example, if a user adds a filter that limits the results to single state, the display engine may be arranged to include the appropriate instructions or information in the query information.

FIGS. 8A and 8B illustrate a logical representation of graph panel 800 for interactive data visualization in accordance with one or more of the various embodiments.

FIG. 8A illustrates one or more of the features of a graph panel, such as, graph panel 800. In some embodiments, graph panel 800 may include one or more defined geometric areas/locations that may be associated with one or more features for generating graph information. In this example, graph panel 800 includes graph path 802, rows 804, and columns 806 arranged vertically.

In one or more of the various embodiments, graph panel 800 may be arranged to enable a user to interactively provide information that may be employed by a display engine to generate graph information based on a graph model. In some embodiments, as the graph information is generated, the display engine may be arranged to modify one or more other panels in the graphical user interface (not shown here) based on the current graph information. Accordingly, in some embodiments, if the graph panel has enough graph information to execute a query, the display engine may be arranged to automatically execute the graph information. In one or more of the various embodiments, results of the query may be employed by the display engine to automatically modify the one or more other panels in the GUI.

In some embodiments, a graph panel may include one or more UI controls that enable a user to interactively provide a graph path. In one or more of the various embodiments, a graph path may be employed by the display engine to provide graph information based on a graph path within the graph model. In some embodiments, a display engine may employ the graph path to identify one or more nodes or relationships from the graph model to include in the graph information. In this example, node element 808, relationship element 810, and node element 812 represent at least a portion of a graph path.

Still referring to FIG. 8A, in this example, for some embodiments, node element 808 corresponds to a product object type or node; relationship element 810 corresponds to a relationship between two or more nodes in the graph model; and node element 812 corresponds to another node in the graph model. Note, the nodes and relationships referred to in this example may be considered to be from graph model 600 shown in FIG. 6. Accordingly, in this example, node element 808 corresponds to product node 600, relationship element 810 corresponds to relationship 614, and node element 812 corresponds to category node 606. Thus, the graph path shown in graph panel row 802 is consistent with graph model 600. In one or more of the various embodiments, the display engine may be arranged to dynamically present graph path options to a user that is interacting with a graph panel. In some embodiments, graph panels, such as, graph panel 800 may be arranged to provide one or more interactive features, such as, buttons, selectors, list controls, tooltips, popup menus, or the like, to suggest or provide one or more graph path elements that a user may select from to add to a graph path. For example, for some embodiments, a user may click on button 814 (here illustrated using a plus sign) to display menu panel 822 for adding graph elements to the graph path in row 802.

Similarly, in some embodiments, graph panels, such as, graph panel 800 may be arranged to provide one or more interactive features, such as, editable text fields, buttons, selectors, list controls, tooltips, popup menus, or the like, to suggest or provide row elements that a user may select from to add to the graph information. For example, for some embodiments, a display engine may enable users to select one or more row elements by interacting with row 804 of graph panel 800.

Also, in some embodiments, graph panels, such as, graph panel 800 may be arranged to provide one or more interactive features, such as, editable text fields, buttons, selectors, list controls, tooltips, popup menus, or the like, to suggest or provide column elements that a user may select from to add to the graph information. For example, for some embodiments, a display engine may enable users to select one or more column elements by interacting with row 806 of graph panel 800.

In one or more of the various embodiments, row 804 may be a portion of graph panel 800 that enables users to select row elements that may be used to generate row information that may be used for generating visualization models used for visualizations. In some cases, row information may define row elements, such as, nodes or values that serve as rows in a visualization. For example, in some embodiments, users may be enabled to select one or more nodes of the graph model or data object objects from a data model from a user interface that lists eligible nodes and objects, if any. Also, in some embodiments, row 804 may enable users to select additional row elements that may include functions or formulas, such as, sum, max, average, or the like. In some embodiments, the row elements in row 804 may be associated with data objects or data object attributes from the data model rather than the graph model. The currently selected row elements may be displayed in row 804.

In one or more of the various embodiments, display engines may generate row information based on the row elements in row 804. In some embodiments, row information may be machine readable information that may be included in graph information that a display engine may employ if executing queries, generating visualization models, generating visualizations, or the like.

Similarly, in some embodiments, row 806 may be a portion of graph panel 800 that enables users to define column information that may be included in graph information that may be employed by display engines when executing queries, generating visualization models, generating visualizations, or the like. Accordingly, in one or more of the various embodiments, column elements included in row 806, such as, nodes, functions, formulas, or the like, may be selected by users from eligible elements that are displayed in one or more user interfaces. Further, in some embodiments, the column elements in row 806 may be associated with data objects or data object attributes from the data model rather than the graph model.

In some embodiments, in response to inputs or interactions, the display engine may be arranged to dynamically determine one or more graph elements that may be eligible to display in the graph panel. Accordingly, in some embodiments, the display engine may be arranged to automatically generate graph information as graph elements are added or removed from the graph path. Likewise, in some embodiments, the display engine may be arranged to automatically update the graph information to include row information as row elements may be added (or removed) to row 804 or update the graph information to include column information as column element may be added (or removed) from row 806.

Accordingly, in some embodiments, the display engine may be arranged to automatically execute queries based on the graph information and update one or more panels in the display environment based on the results of the query execution.

FIG. 8B illustrates a how a display engine may automatically display information that may enable a user to provide a graph path that may be employed to generate graph information.

In some embodiments, the display engine may be arranged to determine one or more candidate elements to include a graph path based on the graph model. In this example, pointer 820 may represent a user indicating their intention to add an element to the graph path. Accordingly, in one or more of the various embodiments, as the user hovers or otherwise interacts with button 814, the display engine may be arranged to evaluate entities or relationships in the data source to determine elements that may be eligible to add to the graph path.

In this example, in response to the user hovering an input device over button 814, the display engine may be arranged to display popup window 822 to the user. In some embodiments, popup window 822 may be arranged to display one or more elements that may be eligible for adding to the graph path. In this example, the display engine may traverse a graph model (e.g., graph model 600) to determine one or more elements, if any, that may be eligible for adding to the graph path. In this example, the display engine may determine that the graph model supports three relationship elements that may be added to the current graph path. Accordingly, in this example, the user may be enabled to select an appropriate element from popup window 822. Similarly, in some embodiments, if the ending element of the graph path is a relationship element, such as, relationship element 810, the display engine may be arranged to populate a popup window, or the like, with the node elements determined to eligible based on the graph model. Accordingly, for example, if the underlying graph model is graph model 800, and if the last element in the current graph path is relationship element 810 (e.g., PART_OF relationship,) the display engine may determine that node element 812 is eligible for adding to the graph path based on an evaluation or traversal of the graph model.

Likewise, in one or more of the various embodiments, the display engine may be arranged to perform similar actions for row 804 or row 806 to enable users to select appropriate or meaningful row elements or column elements.

Figure 9:
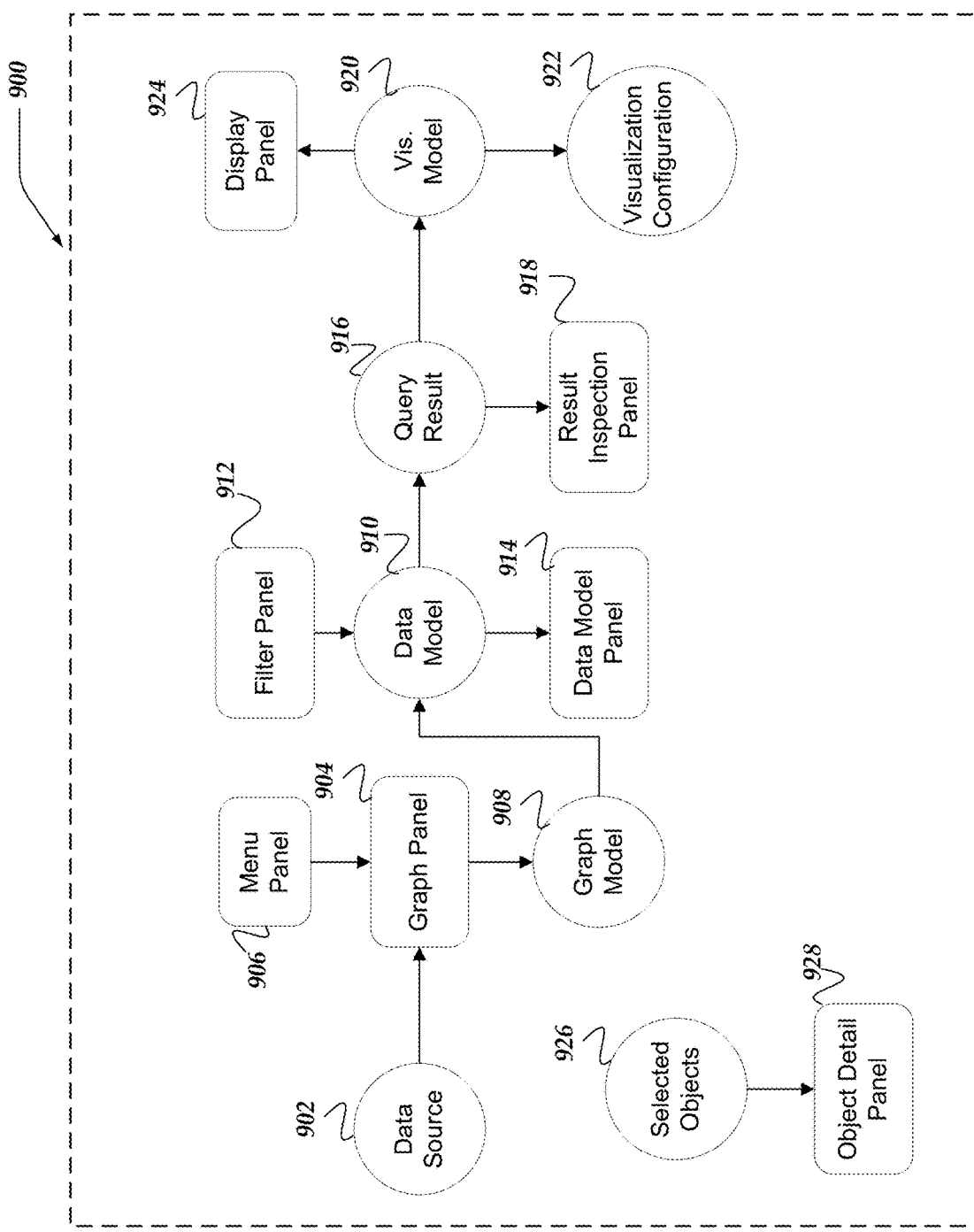
FIG. 9 illustrates a logical schematic of a display engine for interactive data visualization in accordance with one or more of the various embodiments.

FIG. 9 illustrates a logical schematic of display engine 900 for interactive data visualization in accordance with one or more of the various embodiments. In one or more of the various embodiments, display engines, such as, display engine 900 may include one or more components or sub-engines that enable at least interactive data visualization. FIG. 9 illustrates one or more of the relationships or interactions between or among at least a portion of the sub-engines or components that may comprise display engines.

In one or more of the various embodiments, display engine 900 may be arranged to include, various components, including, data source 902, graph panel 904, menu panel 906, graph model 908, query result 910, filter panel 912, data model 914, result inspection panel 916, data model panel 918, visualization model 920, visualization configuration 922, display panel 924, or the like.

In one or more of the various embodiments, data source 902 may be provided to display engine 900. As described above, data source 902 represents the data that may be subject to visualization. For example, in some embodiments, data source 902 may be database comprised on objects, tables, relationships, or the like, that may be arranged to store data. In some embodiments, data source 902 may be a portion of a large data source. Accordingly, in some embodiments display engine 900 may be arranged to employ configuration information to determine the portions of a larger data source that may be included (or represented) by data source 902.

In one or more of the various embodiments, display engine 900 may be arranged to provide graph panel 904. Accordingly, in some embodiments, users may be enabled to interact with graph panel 904 as described above. As users interact with graph panel 904, display engine 900 may provide menu panel 906. In some embodiments, menu panel 906 may be arranged to display and provide access to one or more eligible graph elements that may be selected. In some embodiments, the graph elements included in menu panel 906 may be determined based on data source 902.

As graph elements are added to graph panel 904, graph model 908 may be generated. As additional graph elements are added to graph panel 904, graph model 908 may be automatically updated to include the additional graph elements. In some embodiments, modeling engines may obtain rules or instructions for translating or transforming graph elements into graph models from configuration information.

In one or more of the various embodiments, graph model 908 may be employed to automatically generate data model 910. In some embodiments, there may be one or more intervening or intermediate actions taken to transform information associated with graph model 908 into data model 910. Also, in some embodiments, filter panel 912 may include one or more filter settings that may be associated with the data model before a query is executed.

In one or more of the various embodiments, data model 910 may be employed to automatically generate a query that may be executed against data source 902. In some embodiments, there may be one or more intervening or intermediate actions taken to produce a query based on data model 908 that is suitable for data source 902. Also, in some embodiments, filter panel 912 may include one or more filter settings that may be added to the query before it is executed. For example, if data source 902 is a relational database, data model 908 may be employed to provide one or more SQL statements that may be executed to produce query results 916.

In one or more of the various embodiments, query result 916 and visualization model 920 may be employed to automatically generate visualization 922. Also, in some embodiments, result inspection panel 918may be automatically updated based on query result 916.

In one or more of the various embodiments, visualization model 920 may be automatically generated (or updated) based on query results 916. In some embodiments, the formatting or appearance of visualization model 920 may be based on visualization configuration 922 and then displayed to users in display panel 924.

Accordingly, in one or more of the various embodiments, display engine 900 may be arranged to render one or more visualizations for display in display panel 924. In one or more of the various embodiments, the display engine may automatically update contents shown in the display panel in response to changes or modifications to one or more of row information or column information in graph panel 904, filter panel 912, query results 916, visualization configuration 922, result inspection panel 918, or the like, or combination thereof.

In one or more of the various embodiments, users may be enabled to employ various panels to interactively select one or more objects. Accordingly, in some embodiments, selected objects, such as, selected objects 926 may be displayed in object detail panel 928.

In one or more of the various embodiments, display engine 900 may be arranged to monitor or otherwise receive notifications if data objects represented in the graph model may be selected. Likewise, in some embodiments, display engines may be arranged to monitor or otherwise receive notifications if visualization objects in a visualization may be selected. Accordingly, in some embodiments, selections may be associated with one or more identifiers corresponding to data objects in graph model 908, data source 902, or visualization objects in one or more panels, such as, display panel 924. In some cases, for some embodiments, selections may represent classes of objects, types of objects, instances of classes or types of objects, or the like, depending on the context.

Accordingly, in one or more of the various embodiments, display engine 900 may be arranged to display details that may be associated with selected objects 926 in object detail panel 928. Accordingly, in some embodiments, if selected objects 926 represents a class of data objects or type of data objects, display engine 900 may be arranged to display attribute names, attribute data types, labels, or the like, associated with selected class of objects in object detail panel 928, or the like. In some embodiments, if selected objects 926 represents an object that is an instance of a data object class or a data type, display engine 900 may be arranged to display one or more attributes associated with the class or type of the selected visualization objects and one or more values of the one or more attributes in object detail panel 928.

Generalized Operations

Figure 10:
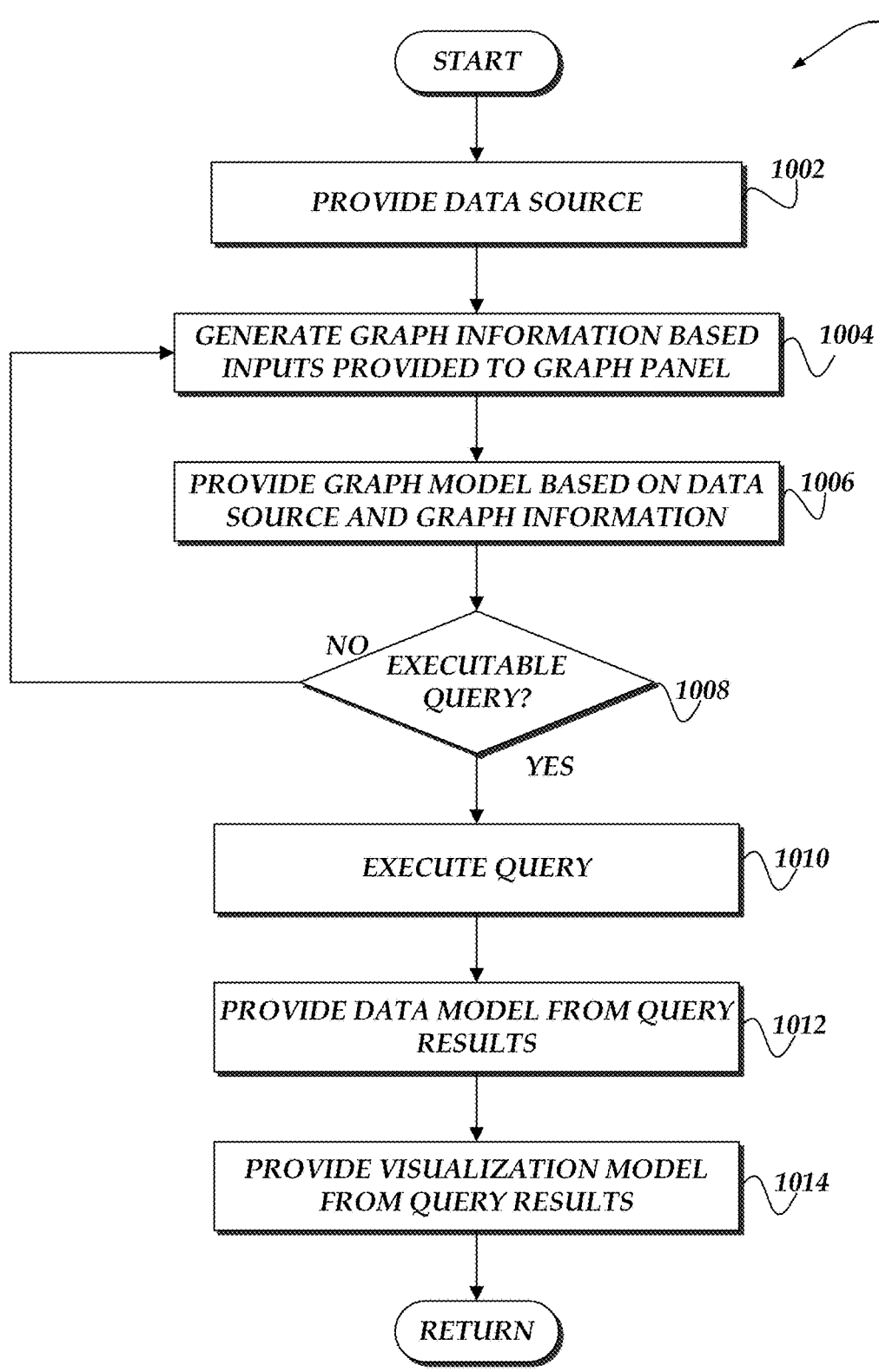
FIG. 10 illustrates an overview flowchart of a process for interactive data visualization in accordance with one or more of the various embodiments.
Figure 11:
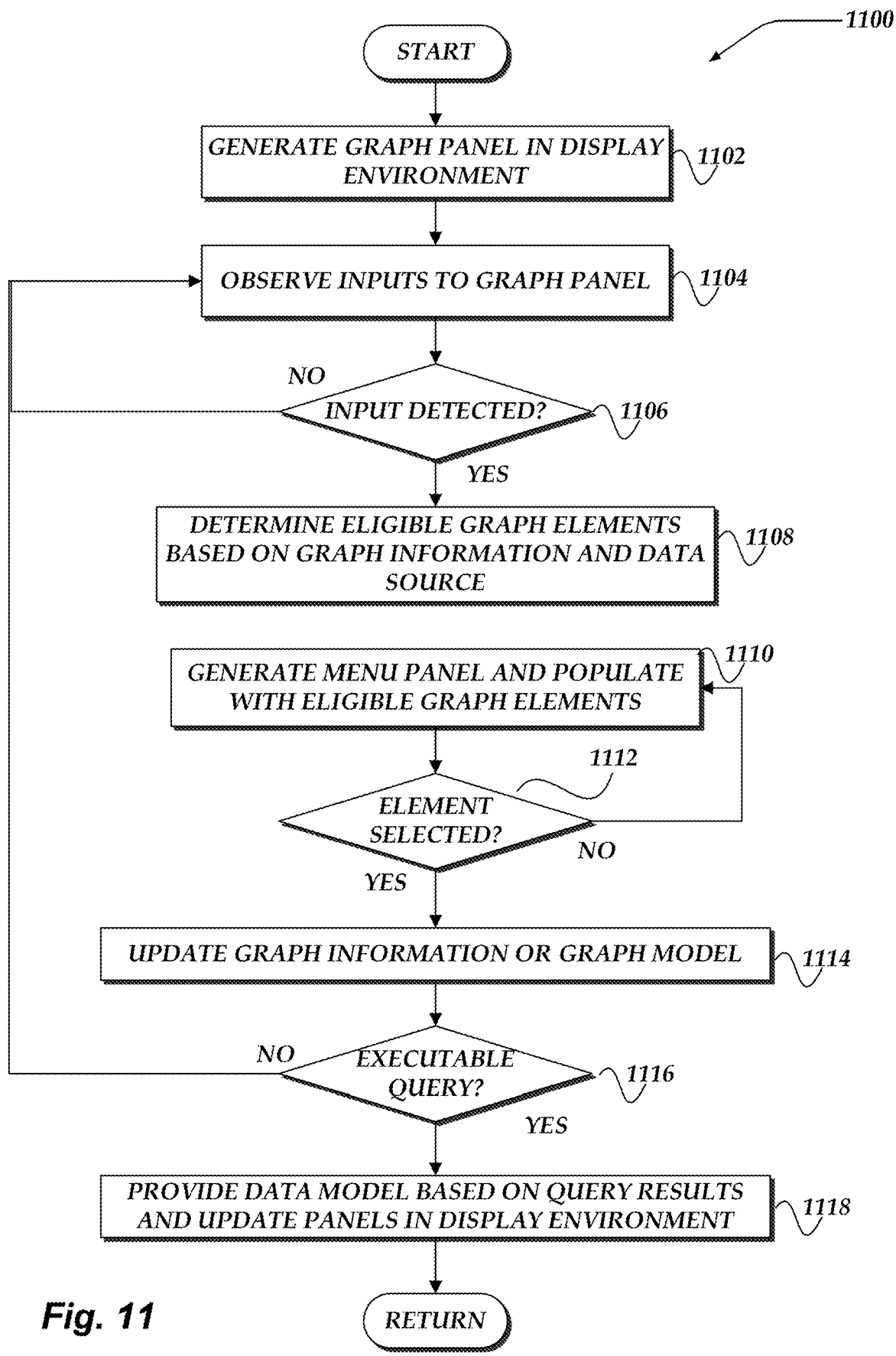
FIG. 11 illustrates a flowchart of a process for generating or executing queries for interactive graph based data visualization in accordance with one or more of the various embodiments.

FIGS. 10-11 represent generalized operations for interactive data visualization in accordance with one or more of the various embodiments. In one or more of the various embodiments, processes 1000 and 1100 described in conjunction with FIGS. 10-11 may be implemented by or executed by one or more processors on a single network computer, such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based environment. However, embodiments are not so limited and various combinations of network computers, client computers, or the like may be utilized. Further, in one or more of the various embodiments, the processes described in conjunction with FIGS. 10-11 may be used for interactive data visualization in accordance with at least one of the various embodiments or architectures such as those described in conjunction with FIGS. 4-9. Further, in one or more of the various embodiments, some or all of the actions performed by processes 1000 and 1100 may be executed in part by modeling engine 322 or display engine 324 running on one or more processors of one or more network computers.

FIG. 10 illustrates an overview flowchart of process 1000 for interactive data visualization in accordance with one or more of the various embodiments. After a start block, at start block 1002, in one or more of the various embodiments, a modeling engine, such as, modeling engine 322 may be arranged to provide a data source a display engine, such as, display engine 324.

At block 1004, in one or more of the various embodiments, the display engine may be arranged to generate graph information that may be based one or more inputs provided to a graph panel. As described above, the graph panel may be arranged to collect inputs that may be employed by the display engine to generate graph information in real-time or near real-time.

At block 1006, in one or more of the various embodiments, the display engine or modeling engine may be arranged to provide a graph model based on the data source and the graph information. In some embodiments, as graph information is produce via a graph panel, a modeling engine may automatically generate or modify a graph model.

At decision block 1008, in one or more of the various embodiments, if the graph model represents an executable query, control may flow to block 1010, otherwise, control may loop back to block 1004. In some embodiments, the display engine or modeling engine may employ pattern matching, templates, grammars, graph analysis, or the like, to determine if the graph information or graph model include information that is necessary and sufficient for generating a well formed query.

At block 1010, in one or more of the various embodiments, the display engine may be arranged to execute a query based on the graph model and graph information to provide query results from the data source.

At block 1012, in one or more of the various embodiments, the display engine or modeling engine may be arranged to provide a data model from the query results.

At block 1014, in one or more of the various embodiments, the display engine may provide a visualization model based on the data model.

Next, in some embodiments, control may be returned to a calling process.

FIG. 11 illustrates a flowchart of process 1100 for interactive data visualization in accordance with one or more of the various embodiments. After a start block, at block 1102, a display engine may be arranged to generate and display a graph panel in a display environment.

At block 1104, in one or more of the various embodiments, the display engine may be arranged to observe one or more inputs to the graph panel.

At decision block 1106, in one or more of the various embodiments, if inputs are detected, control may flow to block 11081 otherwise, control may loop back to block 1104.

At block 1108, in one or more of the various embodiments, the display engine may be arranged to determine one or more eligible graph elements based on graph information collected from the graph panel and the data source.

At block 1110, in one or more of the various embodiments, the display engine may be arranged to generate a menu panel and populate it with one or more of the eligible elements that were determined in block 1108.

At decision block 1112, in one or more of the various embodiments, if one or more graph elements are selected, control may flow to block 1114; otherwise, control may loop back to block 1110.

At block 1114, in one or more of the various embodiments, the display engine or modeling engine may be arranged to update the graph information or graph model based on the selected elements. In some embodiments, the graph information may be in an inconsistent state such that the graph model may remain unchanged. For example, graph information that includes a single object/node may be considered in a consistent state because a single object/node can represented as a graph model. However, in some embodiments, if the graph information includes an unterminated relationship/edge it may be considered inconsistent because a graph model may be unable to represent the unterminated relationship/edge. Likewise, in some embodiments, absent default values, if row or column information has not been selected, the graph information may be considered inconsistent because it may not include enough information to produce the data model or visualization model.

At decision block 1116, in one or more of the various embodiments, if the current graph information (including the recently selected elements) is suitable to provide a graph model and a query, control may flow to block 1118; otherwise, control may loop back to block 1104. Accordingly, in some embodiments, a modeling engine, or the like, may be arranged to evaluate the graph information or graph model to determine if a valid query may be generated. In some embodiments, generating a query may include generating one or more query instructions or query statements that may be compatible with the data source.

At block 1118, in one or more of the various embodiments, the modeling engine, or the like, may be arranged to generate or update the data model based on the query results. In response to a change to the data model, the display engine may be arranged to automatically update one or more panels in the display environment.

Next, in some embodiments, control may be returned to a calling process.

It will be understood that each block in each flowchart illustration, and combinations of blocks in each flowchart illustration, can be implemented by computer program instructions. These program instructions may be provided to a processor to produce a machine, such that the instructions, which execute on the processor, create means for implementing the actions specified in each flowchart block or blocks. The computer program instructions may be executed by a processor to cause a series of operational steps to be performed by the processor to produce a computer-implemented process such that the instructions, which execute on the processor, provide steps for implementing the actions specified in each flowchart block or blocks. The computer program instructions may also cause at least some of the operational steps shown in the blocks of each flowchart to be performed in parallel. Moreover, some of the steps may also be performed across more than one processor, such as might arise in a multi-processor computer system. In addition, one or more blocks or combinations of blocks in each flowchart illustration may also be performed concurrently with other blocks or combinations of blocks, or even in a different sequence than illustrated without departing from the scope or spirit of the invention.

Accordingly, each block in each flowchart illustration supports combinations of means for performing the specified actions, combinations of steps for performing the specified actions and program instruction means for performing the specified actions. It will also be understood that each block in each flowchart illustration, and combinations of blocks in each flowchart illustration, can be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiment, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method for visualizing data using a computer that includes one or more processors, where each step of the method is enabled by the one or more processors that execute instructions, comprising:
    generating a graphical user interface (GUI) that includes a graph panel and a display panel, wherein the graph panel is arranged to receive graph information that includes one or more graph related inputs or interactions;
    generating a graph model based on the graph information and a data source, wherein the graph model is comprised of nodes that represent objects and edges that represent relationships between two or more objects;
    determining whether the graph model and the graph information include information that is required and sufficient to generate an executable query, wherein the determination is based on one or more of pattern matching, templates, grammar, or graph analysis;
    executing the generated executable query to provide one or more results from the data source that are employed to provide a data model and a visualization model that are displayed in the display panel, wherein the graph model is employed to automatically generate the data model, wherein each node in the graph model is associated with a data object in the data model and each edge in the graph model is associated with a relationship in the data model, and wherein a filter panel associates one or more filter settings with the data model prior to execution of the query;
    generating a menu panel that is populated with one or more selected and eligible graph elements based on the graph model and the data source, wherein each selection of each eligible graph element displayed in the menu panel is employed to modify the graph model based on a consistent state of the graph information representing a single node as the graph model for one or more terminated relationships, and wherein the graph model is non-modified based on a non-consistent state of the graph information representing one or more unterminated relationships;
    in response to a pointer hovering over an interactive feature displayed in the graph panel, displaying a popup window as the menu panel for one or more graph elements that are eligible for adding to a graph path of the graph model based on graph information collected from the graph panel and a traversal of the graph model, wherein an eligible graph element that is selected in the popup window is added to the graph path in the graph panel;
    displaying one or more row elements in a row field in the graph panel and displaying one or more column elements in a column field in the graph panel, wherein the one or more row elements and the one or more column elements are employed to provide row information and column information for the visualization and correspond to one or more nodes in the graph model or one or more data objects in the data model, and wherein the one or more row elements and the one or more column elements are selected using the menu panel; and
    employing the modified graph model to provide a modified data model and execute another query that provides one or more results of the other query that are automatically employed to provide a modified visualization model that automatically replaces the visualization model in the display panel.

2. The method of claim 1, wherein generating the GUI further includes providing a model feature panel that displays a list of object identifiers and relationship identifiers that correspond to one or more data objects and one or more relationships included in the data model.

3. The method of claim 1, wherein generating the GUI, further, includes:
    providing a result inspection panel that displays a list of object instances based on the one or more results of the query and the graph model; and
    automatically updating the list of object instances based on the execution of the other query and the one or more results of the other query.

4. The method of claim 1, wherein generating the GUI, further, includes:

generating an object detail panel that displays one or more attributes associated with the one or more data objects and one or more relationships included in the data model; and automatically updating the attributes displayed in the object detail panel based on a data object that is selected in the GUI.

5. The method of claim 1, further comprising:
displaying, in the graph panel, one or more elements that correspond to one or more nodes in the graph model or one or more edges in the graph model.

6. The method of claim 1, further comprising:
determining one or more filters based on one or more of the graph model, data model, or the data source;
modifying the other query based on one or more filters, wherein the one or more filters are displayed in the filter panel on the GUI; and
executing the modified other query to provide one or more results.

7. The method of claim 1,
wherein the one or more row elements and the one or more column elements further comprise one or more functions or formulas.

8. A processor readable non-transitory storage media that includes instructions for visualizing data, wherein execution of the instructions by one or more processors enables performance of actions, comprising:
generating a graphical user interface (GUI) that includes a graph panel and a display panel, wherein the graph panel is arranged to receive graph information that includes one or more graph related inputs or interactions;
generating a graph model based on the graph information and a data source, wherein the graph model is comprised of nodes that represent objects and edges that represent relationships between two or more objects;
determining whether the graph model and the graph information include information that is required and sufficient to generate an executable query, wherein the determination is based on one or more of pattern matching, templates, grammar, or graph analysis;
executing the generated executable query to provide one or more results from the data source that are employed to provide a data model and a visualization model that are displayed in the display panel, wherein the graph model is employed to automatically generate the data model, wherein each node in the graph model is associated with a data object in the data model and each edge in the graph model is associated with a relationship in the data model, and wherein a filter panel associates one or more filter settings with the data model prior to execution of the query;
generating a menu panel that is populated with one or more selected and eligible graph elements based on the graph model and the data source, wherein each selection of each eligible graph element displayed in the menu panel is employed to modify the graph model based on a consistent state of the graph information representing a single node as the graph model for one or more terminated relationships, and wherein the graph model is non-modified based on a non-consistent state of the graph information representing one or more unterminated relationships;
in response to a pointer hovering over an interactive feature displayed in the graph panel, displaying a popup window as the menu panel for one or more graph elements that are eligible for adding to a graph path of the graph model based on graph information collected from the graph panel and a traversal of the graph model, wherein an eligible graph element that is selected in the popup window is added to the graph path in the graph panel;
displaying one or more row elements in a row field in the graph panel and displaying one or more column elements in a column field in the graph panel, wherein the one or more row elements and the one or more column elements are employed to provide row information and column information for the visualization and correspond to one or more nodes in the graph model or one or more data objects in the data model, and wherein the one or more row elements and the one or more column elements are selected using the menu panel; and
employing the modified graph model to provide a modified data model and execute another query that provides one or more results of the other query that are automatically employed to provide a modified visualization model that automatically replaces the visualization model in the display panel.

9. The media of claim 8, wherein generating the GUI further includes providing a model feature panel that displays a list of object identifiers and relationship identifiers that correspond to one or more data objects and one or more relationships included in the data model.

10. The media of claim 8, wherein generating the GUI, further, includes:
providing a result inspection panel that displays a list of object instances based on the one or more results of the query and the graph model; and
automatically updating the list of object instances based on the execution of the other query and the one or more results of the other query.

11. The media of claim 8, wherein generating the GUI, further, includes:
generating an object detail panel that displays one or more attributes associated with the one or more data objects and one or more relationships included in the data model; and
automatically updating the attributes displayed in the object detail panel based on a data object that is selected in the GUI.

12. The media of claim 8, further comprising:
displaying, in the graph panel, one or more elements that correspond to one or more nodes in the graph model or one or more edges in the graph model.

13. The media of claim 8, further comprising:
determining one or more filters based on one or more of the graph model, data model, or the data source;
modifying the other query based on one or more filters, wherein the one or more filters are displayed in the filter panel on the GUI; and
executing the modified other query to provide one or more results.

14. The media of claim 8,
wherein the one or more row elements and the one or more column elements further comprise one or more functions or formulas.

15. A system for visualizing data comprising:
a network computer, comprising:
a transceiver that communicates over a network;
a memory that stores at least instructions; and
one or more processors that execute instructions that enable performance of actions, including:
generating a graphical user interface (GUI) that includes graph panel and a display panel, wherein the graph panel is arranged to receive graph information that includes one or more graph related inputs or interactions;

generating a graph model based on the graph information and a data source, wherein the graph model is comprised of nodes that represent objects and edges that represent relationships between two or more objects;

determining whether the graph model and the graph information include information that is required and sufficient to generate an executable query, wherein the determination is based on one or more of pattern matching, templates, grammar, or graph analysis;

executing the generated executable query to provide one or more results from the data source that are employed to provide a data model and a visualization model that are displayed in the display panel, wherein the graph model is employed to automatically generate the data model, wherein each node in the graph model is associated with a data object in the data model and each edge in the graph model is associated with a relationship in the data model, and wherein a filter panel associates one or more filter settings with the data model prior to execution of the query;

generating a menu panel that is populated with one or more selected and eligible graph elements based on the graph model and the data source, wherein each selection of each eligible graph element displayed in the menu panel is employed to modify the graph model based on a consistent state of the graph information representing a single node as the graph model for one or more terminated relationships, and wherein the graph model is non-modified based on a non-consistent state of the graph information representing one or more unterminated relationships;

in response to a pointer hovering over an interactive feature displayed in the graph panel, displaying a popup window as the menu panel for one or more graph elements that are eligible for adding to a graph path of the graph model based on graph information collected from the graph panel and a traversal of the graph model, wherein an eligible graph element that is selected in the popup window is added to the graph path in the graph panel;

displaying one or more row elements in a row field in the graph panel and displaying one or more column elements in a column field in the graph panel, wherein the one or more row elements and the one or more column elements are employed to provide row information and column information for the visualization and correspond to one or more nodes in the graph model or one or more data objects in the data model, and wherein the one or more row elements and the one or more column elements are selected using the menu panel; and employing the modified graph model to provide a modified data model and execute another query that provides one or more results of the other query that are automatically employed to provide a modified visualization model that automatically replaces the visualization model in the display panel; and a client computer, comprising:
a transceiver that communicates over the network;
a memory that stores at least instructions; and
one or more processors that execute instructions that enable performance of actions, including:
providing the one or more portions of the graph related inputs or interactions to the graph panel.

16. The system of claim 15, wherein generating the GUI further includes: providing a model feature panel that displays a list of object identifiers and relationship identifiers that correspond to one or more data objects and one or more relationships included in the data model.

17. The system of claim 15, wherein generating the GUI, further, includes:
providing a result inspection panel that displays a list of object instances based on the one or more results of the query and the graph model; and
automatically updating the list of object instances based on the execution of the other query and the one or more results of the other query.

18. The system of claim 15, wherein generating the GUI, further, includes:
generating an object detail panel that displays one or more attributes associated with the one or more data objects and one or more relationships included in the data model; and
automatically updating the attributes displayed in the object detail panel based on a data object that is selected in the GUI.

19. The system of claim 15, further comprising:
displaying, in the graph panel, one or more elements that correspond to one or more nodes in the graph model or one or more edges in the graph model.

20. The system of claim 15, further comprising:
determining one or more filters based on one or more of the graph model, data model, or the data source;
modifying the other query based on one or more filters, wherein the one or more filters are displayed in the filter panel on the GUI; and
executing the modified other query to provide one or more results.

21. The system of claim 15,
wherein the one or more row elements and the one or more column elements further comprise one or more functions or formulas.

22. A network computer for visualizing data, comprising:
a transceiver that communicates over a network;
a memory that stores at least instructions; and
one or more processors that execute instructions that enable performance of actions, including:
generating a graphical user interface (GUI) that includes a graph panel and a display panel, wherein the graph panel is arranged to receive graph information that includes one or more graph related inputs or interactions;
generating a graph model based on the graph information and a data source, wherein the graph model is comprised of nodes that represent objects and edges that represent relationships between two or more objects;
determining whether the graph model and the graph information include information that is required and sufficient to generate an executable query, wherein the determination is based on one or more of pattern matching, templates, grammar, or graph analysis;
executing the generated executable query to provide one or more results from the data source that are employed to provide a data model and a visualization model that are displayed in the display panel, wherein the graph model is employed to automatically generate the data model, wherein each node in the graph model is associated with a data object in the data model and each edge in the graph model is associated with a relationship in the data model, and wherein a filter panel associates one or more filter settings with the data model prior to execution of the query;

generating a menu panel that is populated with one or more selected and eligible graph elements based on the graph model and the data source, wherein each selection of each eligible graph element displayed in the menu panel is employed to modify the graph model based on a consistent state of the graph information representing a single node as the graph model for one or more terminated relationships, and wherein the graph model is non-modified based on a non-consistent state of the graph information representing one or more unterminated relationships;

in response to a pointer hovering over an interactive feature displayed in the graph panel, displaying a popup window as the menu panel for one or more graph elements that are eligible for adding to a graph path of the graph model based on graph information collected from the graph panel and a traversal of the graph model, wherein an eligible graph element that is selected in the popup window is added to the graph path in the graph panel;

displaying one or more row elements in a row field in the graph panel and displaying one or more column elements in a column field in the graph panel, wherein the one or more row elements and the one or more column elements are employed to provide row information and column information for the visualization and correspond to one or more nodes in the graph model or one or more data objects in the data model, and wherein the one or more row elements and the one or more column elements are selected using the menu panel; and employing the modified graph model to provide a modified data model and execute another query that provides one or more results of the other query that are automatically employed to provide a modified visualization model that automatically replaces the visualization model in the display panel.

23. The network computer of claim 22, wherein generating the GUI further includes providing a model feature panel that displays a list of object identifiers and relationship identifiers that correspond to one or more data objects and one or more relationships included in the data model.

24. The network computer of claim 22, wherein generating the GUI, further, includes:
  providing a result inspection panel that displays a list of object instances based on the one or more results of the query and the graph model; and
  automatically updating the list of object instances based on the execution of the other query and the one or more results of the other query.

25. The network computer of claim 22, wherein generating the GUI, further, includes:
  generating an object detail panel that displays one or more attributes associated with the one or more data objects and one or more relationships included in the data model; and
  automatically updating the attributes displayed in the object detail panel based on a data object that is selected in the GUI.

26. The network computer of claim 22, further comprising:
  displaying, in the graph panel, one or more elements that correspond to one or more nodes in the graph model or one or more edges in the graph model.

27. The network computer of claim 22, further comprising:
  determining one or more filters based on one or more of the graph model, data model, or the data source;
  modifying the other query based on one or more filters, wherein the one or more filters are displayed in the filter panel on the GUI; and
  executing the modified other query to provide one or more results.

28. The network computer of claim 22, wherein the one or more row elements and the one or more column elements further comprise one or more functions or formulas.

* * * * *